United States Patent
Dong et al.

(10) Patent No.: US 12,543,154 B2
(45) Date of Patent: Feb. 3, 2026

(54) COMMUNICATION METHOD AND APPARATUS

(71) Applicant: HUAWEI TECHNOLOGIES CO., LTD., Guangdong (CN)

(72) Inventors: Lei Dong, Shanghai (CN); Hongjia Su, Shanghai (CN); Wenting Guo, Shenzhen (CN); Lei Lu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 318 days.

(21) Appl. No.: 18/342,198

(22) Filed: Jun. 27, 2023

(65) Prior Publication Data

US 2023/0345423 A1 Oct. 26, 2023

Related U.S. Application Data

(63) Continuation of application No. PCT/CN2020/142548, filed on Dec. 31, 2020.

(51) Int. Cl.
*H04W 72/02* (2009.01)
*H04W 72/0446* (2023.01)
*H04W 72/0453* (2023.01)

(52) U.S. Cl.
CPC ....... *H04W 72/02* (2013.01); *H04W 72/0446* (2013.01); *H04W 72/0453* (2013.01)

(58) Field of Classification Search
CPC ............. H04W 72/02; H04W 72/0446; H04W 72/0453; H04W 72/40; H04W 72/25
See application file for complete search history.

(56) References Cited

U.S. PATENT DOCUMENTS

| | | | |
|---|---|---|---|
| 2019/0124636 A1* | 4/2019 | Jiang | H04W 72/044 |
| 2020/0229171 A1* | 7/2020 | Khoryaev | H04W 4/40 |
| 2020/0280915 A1* | 9/2020 | Lu | H04L 5/16 |
| 2020/0288467 A1 | 9/2020 | Yoon | |
| 2020/0344574 A1 | 10/2020 | Park et al. | |
| 2021/0014831 A1* | 1/2021 | Ryu | H04W 72/02 |
| 2021/0160852 A1* | 5/2021 | Zhao | H04W 72/044 |

FOREIGN PATENT DOCUMENTS

| | | |
|---|---|---|
| CN | 111726871 A | 9/2020 |
| CN | 111756476 A | 10/2020 |

OTHER PUBLICATIONS

Huawei et al., "Sidelink physical layer structure for NR V2X," 3GPP TSG RAN WG1 Meeting #96bis, R1-1903943, Xi'an, China, Apr. 8-12, 2019, 17 pages.

(Continued)

*Primary Examiner* — Dady Chery
(74) *Attorney, Agent, or Firm* — Fish & Richardson P.C.

(57) ABSTRACT

Example communication methods and apparatus are provided. One example method includes determining a first transmission resource in a first resource pool by a first terminal device, where each transmission resource in the first resource pool occupies some or all symbols of one slot in time domain, and each transmission resource in the first resource pool occupies one or more sub-channels in frequency domain. The first terminal device sends the first message to a second terminal device by using the first transmission resource.

20 Claims, 13 Drawing Sheets

(56) References Cited

OTHER PUBLICATIONS

Nokia et al., "Discussion of physical layer structure for sidelink," 3GPP TSG RAN WG1 #98bis, R1-1910512, Chongqing, China, Oct. 14-20, 2019, 16 pages.
International Search Report and Written Opinion in International Appln. No. PCT/CN2020/142548, mailed on Sep. 28, 2021, 14 pages (with English translation).
Fraunhofer HHI et al., "Resource Allocation Enhancements for Mode 2," 3GPP TSG RAN WG1 Meeting #103-e, R1-2008757, e-Meeting, Oct. 26-Nov. 13, 2020, 9 pages.
LG Electronics, "Discussion on resource allocation mechanism for NR V2X," 3GPP TSG RAN WG1 #96, R1-1901933, Athens, Greece, Feb. 25-Mar. 1, 2019, 12 pages.
Extended European Search Report in European Appln No. 20967931.5, dated Nov. 2, 2023, 10 pages.

\* cited by examiner

COMMUNICATION METHOD AND APPARATUS

CROSS-REFERENCE TO RELATED APPLICATIONS

This application is a continuation of International Application No. PCT/CN2020/142548, filed on Dec. 31, 2020, the disclosure of which is hereby incorporated by reference in its entirety.

TECHNICAL FIELD

This application relates to the field of communication technologies, and in particular, to a communication method and apparatus.

BACKGROUND

With development of wireless communication technologies, people have increasing requirements for a high data rate and user experience, and have increasing requirements for a proximity service that know and communicate with surrounding people or things. Therefore, a device-to-device (D2D) technology emerges. Application of the D2D technology can relieve load of a cellular network, reduce battery power consumption of user equipment, improve a data rate, and better meet a requirement for a proximity service. The D2D technology allows a plurality of user equipments (UEs) that support a D2D function to perform direct discovery and direct communication regardless of whether there is a network infrastructure. In view of features and advantages of the D2D technology, a D2D technology-based internet-of-vehicles application scenario is proposed. However, in consideration of security, this scenario imposes a very high requirement on a delay, and cannot be implemented by using the existing D2D technology.

Therefore, in a network with a long term evolution (LTE) technology provided by the 3rd Generation Partnership Project (3GPP), an internet-of-vehicles technology for vehicle-to-everything (V2X) communication is proposed. As shown in FIG. 1, V2X communication is communication between a vehicle and anything, including vehicle-to-vehicle (V2V) communication, vehicle-to-pedestrian (V2P) communication, vehicle-to-infrastructure (V2I) communication, and vehicle-to-network (V2N) communication.

There are two sidelink (SL)-related resource allocation modes in new radio vehicle-to-everything (NR-V2X): a mode in which a base station allocates a resource, which is also referred to as a mode-1 and a mode in which a user autonomously selects a resource, which is also referred to as a mode-2. The mode in which a base station allocates a resource is mainly applied to V2X communication with network coverage. The base station centrally allocates resources based on a reporting status of a buffer status report (BSR) of UE, and the resources allocated by the base station include an initial resource and/or a retransmission resource. In the mode in which a user autonomously selects a resource, a transmission resource of transmitting UE does not depend on a base station, and the UE autonomously selects a transmission resource from a preconfigured resource pool for communication. This mode is not restricted by network coverage, and the transmitting UE can also perform communication in this mode without network coverage. Resources autonomously selected by the user include an initial resource and/or a retransmission resource.

In the mode in which a user autonomously selects a resource, the transmitting UE may sense an idle resource in the preconfigured resource pool, and then communicate with receiving UE by using the idle resource. To improve resource allocation performance in the mode in which a user autonomously selects a resource, an inter-UE coordination mechanism is further proposed, that is, the transmitting UE may select a resource by coordinating with another UE. The coordinating UE herein may be the receiving UE, or may be another UE close to the receiving UE. The transmitting UE can more accurately determine a transmission resource in the preconfigured resource pool by using a coordination message sent by the coordinating UE, to reduce system interference and improve transmission efficiency. The inter-UE coordination mechanism may be specifically classified into an explicit trigger-based coordination mechanism and a non-explicit trigger-based coordination mechanism. For the explicit trigger-based coordination mechanism, the transmitting UE first sends a trigger message to the coordinating UE, and then the coordinating UE sends a coordination message to the transmitting UE. For the non-explicit trigger-based mechanism, the coordinating UE directly sends a coordination message to the transmitting UE.

In an existing solution, a trigger message and a coordination message are sent in a preconfigured resource pool, and the resource pool and the foregoing resource pool in which SL information is transmitted between the transmitting UE and the receiving UE in the mode in which a user autonomously selects a resource are a same resource pool, that is, the transmitting UE and the coordinating UE send a trigger message and a coordination message in an SL resource pool. In addition, according to an existing sidelink transmission requirement, one transmission needs to occupy an entire slot, that is, transmission of the trigger message and the coordination message needs to occupy an entire slot in the SL resource pool. If the trigger message or the coordination message includes a small quantity of bits, more resources may be wasted.

SUMMARY

This application provides a communication method and apparatus, to reduce a waste of time domain resources.

According to a first aspect, a communication method is provided, including: A first terminal device determines a first transmission resource in a first resource pool, where the first transmission resource is used to transmit a first message, each transmission resource in the first resource pool occupies some or all symbols of one slot in time domain, and each transmission resource in the first resource pool occupies one or more sub-channels in frequency domain; and the first terminal device sends the first message to a second terminal device by using the first transmission resource.

According to the foregoing method, a resource pool, that is, the first resource pool, is separately configured. The resource pool is specially used to transmit a trigger message or a coordination message. One slot in the resource pool may include a plurality of transmission resources, and transmission of the trigger message or the coordination message occupies one transmission resource at a time. In other words, a resource occupied by the trigger message or the coordination message in time domain is less than one slot. Compared with one slot that needs to be occupied for transmitting a trigger message or a coordination message in an SL resource pool, time domain resources occupied for transmitting the trigger message or the coordination message may be reduced when the resource pool is independently configured. Therefore, time domain resource utilization may be improved.

In a possible implementation, the method further includes: The first terminal device determines at least one transmission resource in the first resource pool, where the first resource pool is further used to transmit a second message; and the first terminal device receives the second message from the second terminal device on the at least one transmission resource.

For example, the second message is used by the first terminal device to determine the first message, the first message is used by the second terminal device to determine a third transmission resource in a second resource pool, and the third transmission resource is used by the second terminal device to send a third message. The third message may be carried on at least one of a physical sidelink control channel PSCCH, a physical sidelink shared channel PSSCH, or a physical sidelink feedback channel PSFCH. Each transmission resource in the second resource pool occupies some or all symbols of one slot in time domain.

Optionally, a time domain start location and/or a quantity of occupied time domain symbols of each transmission resource in the first resource pool are/is preconfigured in the first terminal device, or the first terminal device determines a time domain start location and/or a quantity of occupied time domain symbols of each transmission resource based on configuration signaling from a network device.

Optionally, the configuration signaling is a system information block SIB, radio resource control RRC signaling, or physical layer control information.

Optionally, a first time domain symbol occupied by each transmission resource in the first resource pool is used for automatic gain control AGC adjustment performed by a receive end.

Optionally, the first resource pool and the second resource pool are subject to time division multiplexing.

In a possible implementation, that a first terminal device determines a first transmission resource in a first resource pool includes: The first terminal device determines, based on an index of the first terminal device and/or an index of the second terminal device, an index corresponding to the first transmission resource, where the transmission resource corresponding to the index in the first resource pool is a transmission resource used to send the first message.

According to the foregoing method, the first terminal device and the second terminal device may determine the index of the first terminal device based on an identifier of the first terminal device and/or an identifier of the second terminal device. Therefore, the first terminal device or the second terminal device does not need to additionally determine, based on a sensing reservation procedure, a resource for sending a trigger message or a coordination message, so that a power of the terminal device can be reduced. This achieves an energy saving effect, and is especially applicable to a terminal device whose power is limited. In addition, system complexity and interference enhancement that are caused by the sensing reservation process may be avoided.

In a possible implementation, that the first terminal device determines at least one transmission resource in the first resource pool includes: The first terminal device determines an index of the at least one transmission resource based on the index of the first terminal device, where the at least one transmission resource corresponding to the index in the first resource pool is a transmission resource used to receive the second message.

In another possible implementation, that a first terminal device determines a first transmission resource in a first resource pool includes: The first terminal device determines an index of a second transmission resource based on the index of the first terminal device and the index of the second terminal device, where the transmission resource corresponding to the index in the first resource pool is a transmission resource used to receive the second message.

According to a second aspect, a communication method is provided, including: A second terminal device determines at least one transmission resource in a first resource pool; the second terminal device receives a first message from a first terminal device on the at least one transmission resource, where the first resource pool is used to transmit the first message, each transmission resource in the first resource pool occupies some or all symbols of one slot in time domain, and each transmission resource in the first resource pool occupies one or more sub-channels in frequency domain.

Optionally, the method further includes: The second terminal device determines a second transmission resource in the first resource pool, where the first resource pool is further used to transmit a second message; and the second terminal device sends the second message to the first terminal device by using the second transmission resource.

Optionally, the second message is used by the first terminal device to determine the first message, the first message is used by the second terminal device to determine a third transmission resource in a second resource pool, and the third transmission resource is used by the second terminal device to send a third message. The third message is carried on at least one of a physical sidelink control channel PSCCH, a physical sidelink shared channel PSSCH, or a physical sidelink feedback channel PSFCH. Each transmission resource in the second resource pool occupies some or all symbols of one slot in time domain.

Optionally, a time domain start location and/or a quantity of occupied time domain symbols of each transmission resource in the first resource pool are/is preconfigured in the second terminal device, or the second terminal device determines a time domain start location and/or a quantity of occupied time domain symbols of each transmission resource based on configuration signaling from a network device.

Optionally, the configuration signaling is a system information block SIB, radio resource control RRC signaling, or physical layer control signaling.

Optionally, a first time domain symbol occupied by each transmission resource in the first resource pool is used for automatic gain control AGC adjustment performed by a receive end.

Optionally, the first resource pool and the second resource pool are subject to time division multiplexing.

Optionally, that a second terminal device determines at least one transmission resource in a first resource pool includes: The second terminal device determines, based on an index of the second terminal device, an index of a transmission resource used to receive the first message, where the transmission resource corresponding to the index in the first resource pool is a transmission resource used to receive the first message.

Optionally, that a second terminal device determines at least one transmission resource in a first resource pool includes: The second terminal device determines an index of a first transmission resource based on an index of the second terminal device and an index of the first terminal device, where the transmission resource corresponding to the index in the first resource pool is a transmission resource used to receive the first message.

Optionally, the second terminal device determines a second transmission resource in the first resource pool includes: The second terminal device determines an index of the second transmission resource based on the index of the first terminal device and the index of the second terminal device, where the transmission resource corresponding to the index in the first resource pool is a transmission resource used to send the second message.

According to a third aspect, a communication apparatus is provided, including the apparatus configured to implement any one of the first aspect or the second aspect.

According to a fourth aspect, a communication apparatus is provided, including a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method in an implementation of any one of the first aspect or the second aspect by using a logic circuit or by executing code instructions.

According to a fifth aspect, a computer-readable storage medium is provided. The computer-readable storage medium stores a computer program or instructions. When the computer program is executed or the instructions are executed, the method in an implementation of any one of the first aspect or the second aspect is implemented.

According to a sixth aspect, a computer program product including instructions is provided. When the instructions are run, the method in an implementation of any one of the first aspect or the second aspect is implemented.

According to a seventh aspect, a chip system is provided. The chip system includes a processor, may further include a memory, and is configured to implement the method according to any one of the first aspect or the second aspect. The chip system may include a chip, or may include a chip and another discrete component.

DESCRIPTION OF EMBODIMENTS

Figure 1:
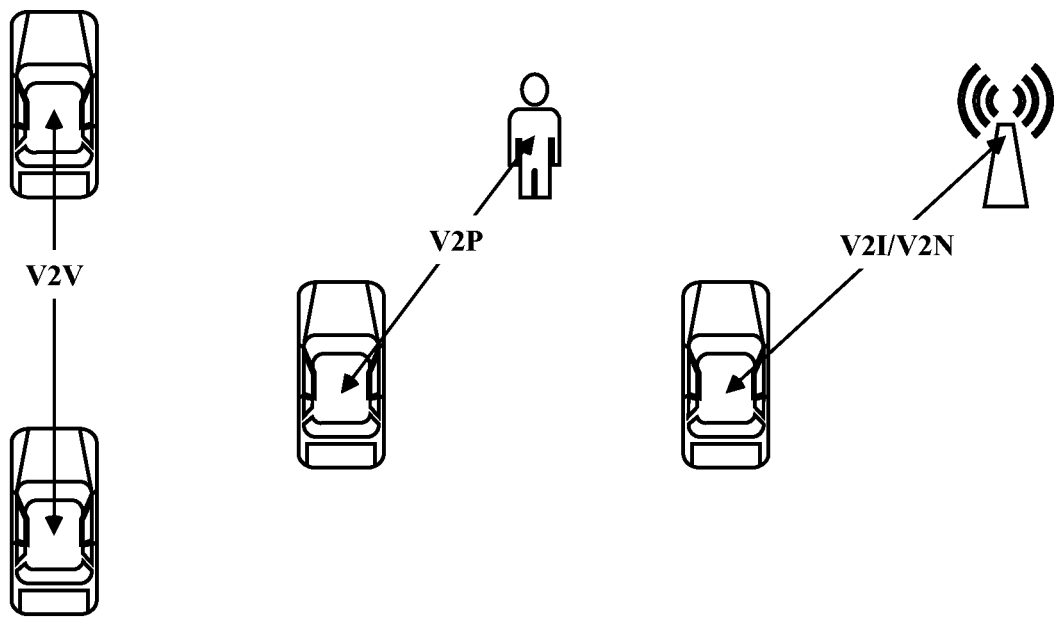
FIG. 1 is a schematic diagram of V2X communication according to an embodiment of this application.

For ease of understanding, descriptions of related concepts in this application are provided as examples for reference below:

1. Terminal Device

The terminal device may be referred to as a terminal for short, and is a device having a wireless transceiver function. The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone, a tablet computer, a computer having a wireless transceiver function, a virtual reality (VR) terminal device, an augmented reality (AR) terminal device, a wireless terminal device in industrial control, a wireless terminal device in self-driving, a wireless terminal device in tele-medicine, a wireless terminal device in a smart grid, a wireless terminal device in transportation safety, a wireless terminal device in a smart city, a wireless terminal device in a smart home, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as user equipment (UE), an access terminal device, a vehicle-mounted terminal device, a terminal device in industrial control, a UE unit, a UE station, a mobile station, a remote station, a remote terminal device, a mobile device, a wireless communication device, a UE agent, a UE apparatus, or the like. The terminal device may be fixed or mobile. This is not limited in embodiments of this application.

Considering sidelink air interface transmission, both a receive end and a transmit end of wireless communication are terminal devices. Alternatively, the terminal device may be a vehicle-mounted terminal device, a vehicle-mounted communication module embedded in a vehicle-mounted terminal device, another embedded communication module, or the like, or may be a handheld communication device of a user, including a mobile phone, a tablet computer, or the like.

2. Sidelink (SL)

The sidelink is used for communication between terminal devices, and may include a physical sidelink shared channel (PSSCH) and a physical sidelink control channel (PSCCH). The PSSCH is used to carry sidelink data (SL data), the PSCCH is used to carry sidelink control information (SCI), and the SCI may also be referred to as a sidelink scheduling assignment (SL SA). The SL SA is information related to data scheduling. For example, the SL SA is used to carry information such as resource allocation and/or a modulation and coding scheme (MCS) of the PSSCH.

Optionally, sidelink communication may further include a physical sidelink feedback channel (PSFCH). The physical sidelink feedback channel may also be referred to as a sidelink feedback channel for short. The physical sidelink feedback channel may be used to transmit sidelink feedback control information (SFCI), and the sidelink feedback control information may also be referred to as sidelink feedback information for short. The sidelink feedback control information may include one or more of the following information: channel state information (CSI), hybrid automatic repeat request (HARQ) information, and the like. The HARQ information may include acknowledgement (ACK) information, a negative acknowledgement (NACK), or the like.

3. SL Resource Allocation

There are two SL resource allocation modes: a mode 1 and a mode 2. This application is mainly related to the mode 2. Therefore, the mode 2 is mainly described. The mode 2 is also referred to as a mode in which a user autonomously selects a resource. A transmission resource of UE does not depend on a network device, and transmitting UE autonomously selects a transmission resource for communication. This mode is not restricted by network device coverage, and the transmitting UE can also perform communication in this mode without network coverage. Resources autonomously selected by the user includes an initial transmission resource and/or a retransmission resource.

Figure 2A:
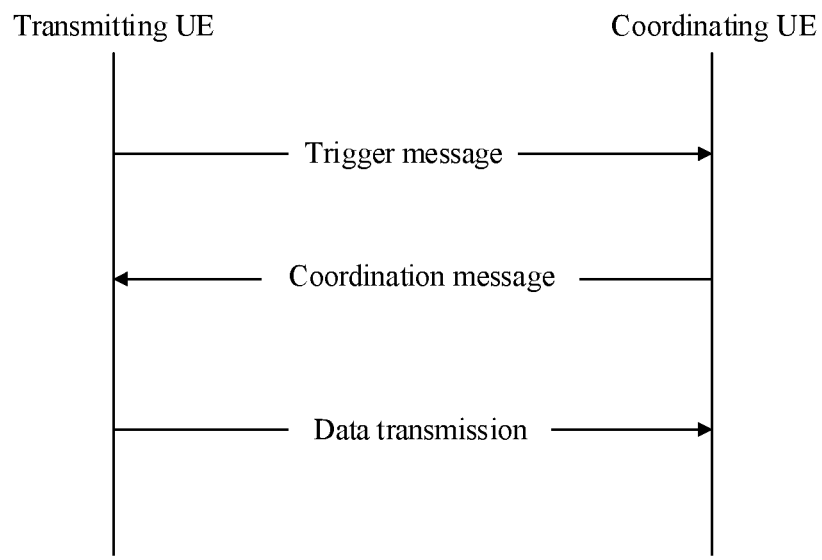
FIG. 2a and FIG. 2b are flowcharts of coordination performed by coordinating UE according to embodiments of this application.
Figure 2B:
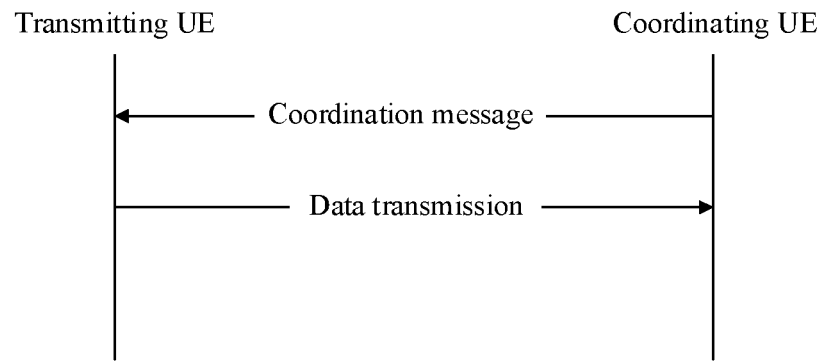

To improve resource allocation performance in mode 2, the 3GPP standard organization initiates an inter-UE coordination mechanism in release 17. The standard discusses a basic requirement of a UE coordination mechanism, but a specific application is not specified. The UE coordination mechanism may be classified into a trigger-based coordination mechanism and a non-trigger-based coordination mechanism. For example, for the trigger-based coordination mechanism, if a transmitting terminal needs a coordination message of a coordinating terminal, the transmitting terminal needs to first explicitly send a trigger message to the coordinating terminal, to trigger the coordinating terminal to feed back the coordination message to the transmitting terminal, as shown in FIG. 2a. In this case, the UE coordination mechanism may be actively triggered by a coordinated terminal, that is, the transmitting terminal. For the non-trigger-based coordination mechanism, the transmitting terminal does not need to actively send a trigger message to the coordinating terminal, and the coordinating terminal spontaneously feeds back a coordination message to the transmitting terminal, as shown in FIG. 2b. In this case, the coordinating terminal may send the coordination message based on an event trigger, or in another manner such as based on some predefined conditions. This is not limited in this application. In addition to the foregoing trigger-based and non-trigger-based manners, the UE coordination mechanism may alternatively be triggered by a network device by using signaling, periodically triggered, or the like. This is not limited in this application either. In the UE coordination mechanism, terminals may coordinate with each other in each phase of SL communication. For example, the coordinating terminal may assist the transmitting terminal in selecting a resource. The transmitting terminal may further perform transmission on a sidelink resource under coordination of another terminal. For example, in interaction procedures shown in FIG. 2a and FIG. 2b, the transmitting terminal sends sidelink data to the coordinating terminal or another terminal other than the coordinating terminal based on the coordination message from the coordinating terminal. Specifically, the coordination message from the coordinating terminal may be used to assist the coordinated terminal in sidelink transmission. For example, the coordination message may include indication information of a usable sidelink resource and/or indication information of an unusable sidelink resource. The unusable sidelink resource indicated by the coordinating terminal by using the coordination message may be a resource that is detected by the coordinating terminal and that has been reserved by another terminal, a resource that is to be used by the coordinating terminal to send or receive data, or the like. Correspondingly, the usable sidelink resource indicated in the coordination message may be determined by the coordinating terminal based on sensing and/or a resource used by the coordinating terminal to send or receive data, for example, a remaining resource after the reserved resource is excluded from a sidelink resource pool. The transmitting terminal (or referred to as a coordinated terminal) may select a resource more effectively by using the foregoing information provided by the coordinating terminal, so that interference is avoided and system throughput is improved.

It should be noted that words such as "first" and "second" in embodiments of this application are only used for distinctive description, but cannot be understood as indication or implication of relative importance, and cannot be understood as an indication or implication of a sequence. "At least one" means one or more, and "a plurality of" means two or more. A term "and/or" describes an association relationship between associated objects and represents that three relationships may exist. For example, A and/or B may represent the following cases: Only A exists, both A and B exist, and only B exists, where A and B may be singular or plural. A character "/" generally represents an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

Figure 3:
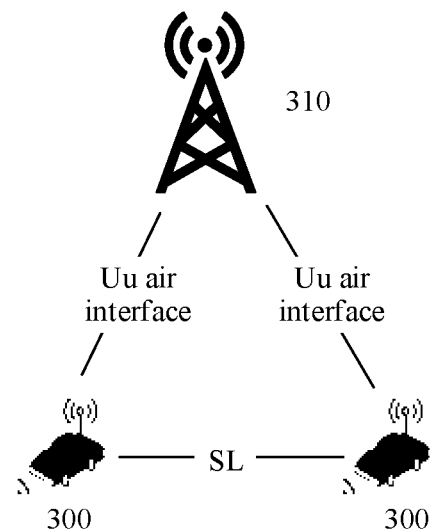
FIG. 3 is a schematic diagram of a communication system according to an embodiment of this application.

FIG. 3 shows a possible network architecture to which an embodiment of this application is applicable. The network architecture includes a terminal device 300.

There are two or more terminal devices 300. In addition, different terminal devices may communicate with each other by using an SL, and a communication manner may include a unicast manner, a multicast manner, a broadcast manner, and/or the like.

Optionally, the network architecture may further include a network device 310. The terminal device 300 may communicate with the network device 310 through a Uu air interface. The Uu air interface may be understood as a universal interface between user equipment (UE) and a network (universal UE to network interface). Transmission through the Uu air interface may include uplink transmission and downlink transmission. The uplink transmission means that a terminal device sends information to a network device, and the information sent through uplink transmission may be referred to as uplink information or an uplink signal. The uplink information or the uplink signal may include one or more of an uplink data signal, an uplink control signal, or a sounding reference signal (SRS). The downlink transmission means that a network device sends information to a terminal device, and the information sent through the downlink transmission may be downlink information or a downlink signal. The downlink information or the downlink signal may include one or more of a downlink data signal, a downlink control signal, a channel state information reference signal (CSI-RS), or a phase tracking reference signal (PTRS).

It should be noted that the foregoing network architecture is merely an example for description, and is not intended to limit this embodiment of this application. A person of ordinary skill in the art may learn that the technical solutions provided in embodiments of this application are also applicable to a similar technical problem as a network architecture and a new service scenario emerge.

It should be noted that the technical solutions provided in embodiments of this application may be applied to a system in which a terminal device directly communicates with a terminal device, such as a vehicle-to-everything (V2X) system or a device-to-device (D2D) system. This method is applicable to a communication scenario with network coverage and a communication scenario without network coverage. The two terminal devices may be within network device coverage, or may be beyond network device coverage.

Figure 4:
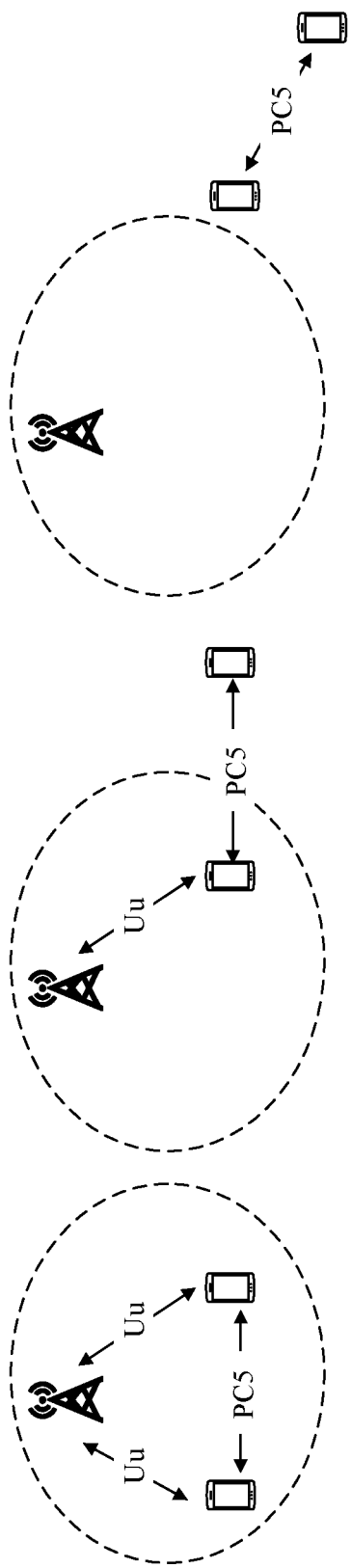
FIG. 4 is a schematic diagram of an application scenario according to an embodiment of this application.

As shown in FIG. 4, two terminal devices may be both located within network device coverage, or either of the two terminal devices is located within network coverage, and the other terminal device is located beyond network coverage, or the two terminal devices are both located beyond network device coverage. An interface between the terminal device and a network device is a Uu air interface, and an interface for SL communication between different terminal devices is a PC5 interface.

Embodiments of this application provides a communication method and apparatus. Principles of the communication method and apparatus are as follows: A resource pool is separately configured. The resource pool is specially used to transmit a trigger message or a coordination message. One slot in the resource pool may include a plurality of transmission resources, and transmission of the trigger message or the coordination message occupies one transmission resource at a time. In other words, a resource occupied by the trigger message or the coordination message in time domain is less than one slot. Compared with one slot that needs to be occupied for transmitting a trigger message or a coordination message in an SL resource pool, time domain resources occupied for transmitting the trigger message or the coordination message may be reduced when the resource pool is independently configured. Therefore, time domain resource utilization may be improved.

Embodiment 1

A resource pool configured for a trigger message and/or a coordination message is first described. To distinguish from a sidelink resource pool in a current technology, in descriptions of this application, the resource pool used to transmit a trigger message and/or a coordination message is referred to as a first resource pool. Optionally, the first resource pool may also be referred to as a dedicated resource pool, a coordination resource pool, a dedicated coordination resource pool, or the like. A resource pool used for sidelink transmission in the current technology may be referred to as a second resource pool. A terminal device may transmit some or all of sidelink data information, control information, and feedback information in the second resource pool. Each transmission resource in the second resource pool occupies some or all symbols of one slot in time domain.

Figure 11:
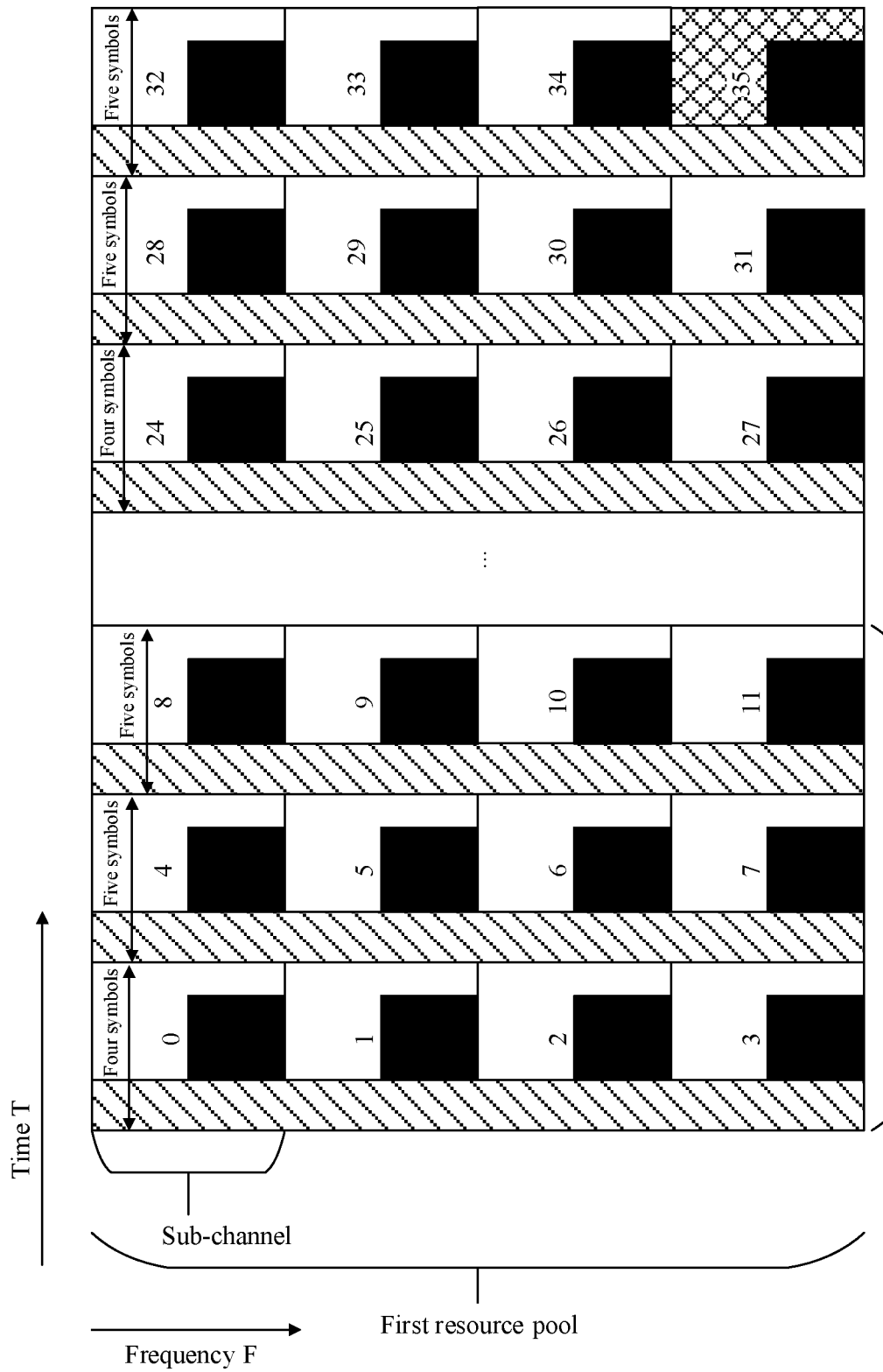
FIG. 11 is a schematic diagram of a sequence for transmission resource indexes in a dedicated resource pool according to an embodiment of this application.

For example, the first resource pool includes a plurality of transmission resources. The transmission resources may also be referred to as coordination resources. Each transmission resource may be used to send a trigger message and/or a coordination message. Each transmission resource occupies some or all symbols of one slot in time domain, and occupies one or more sub-channels in frequency domain. That each transmission resource occupies some or all symbols of one slot in time domain may be described as follows: If one transmission resource occupies all symbols of one slot in time domain, one slot includes one transmission resource. If one transmission resource occupies some symbols of one slot in time domain, a quantity of transmission resources included in one slot mainly depends on a quantity of symbols included in one slot and a quantity of symbols occupied by each transmission resource. For example, one slot includes 14 symbols. If one transmission resource occupies 13 symbols, the slot includes only one transmission resource. Alternatively, one slot may further include three transmission resources. As shown in FIG. 11, quantities of symbols occupied by the three transmission resources in time domain are respectively four symbols, five symbols, and five symbols.

It should be noted that in this embodiment of this application, quantities of symbols occupied in time domain by any two of the plurality of transmission resources included in the first resource pool may be the same or different. For example, as shown in FIG. 11, the first resource pool includes 35 transmission resources, and a quantity of symbols occupied by any one of the 35 transmission resources may be 4 or 5. Quantities of sub-channels occupied in frequency domain by any two transmission resources in the first resource pool may be the same or different. For example, in FIG. 11, all transmission resources in the first resource pool occupy only one sub-channel in frequency domain.

For example, in this application, start locations and/or quantities of symbols occupied in time domain that are of all transmission resources included in one slot may be preconfigured in a terminal device, or may be delivered by a network device to a terminal device by using configuration signaling. The configuration signaling may be a system information block (SIB), radio resource control (RRC), or physical layer control information. The first symbol occupied by each transmission resource is used by a receive end to perform automatic gain control (AGC) adjustment. The automatic gain control adjustment refers to an automatic control manner in which a gain of an amplification circuit at the receive end is automatically adjusted with a signal strength, so that when a voltage of an input signal changes greatly, an output voltage of a receiver is kept constant or basically unchanged. Specifically, when the input signal is very weak, a linear amplification circuit works, to ensure a strength of an output signal; or when the input signal is very strong, a compression amplification circuit is started, to reduce a strength of an output signal. Optionally, in the first resource pool, a total quantity of symbols of all transmission resources included in one slot should not exceed a total quantity of symbols included in the slot.

Figure 5:
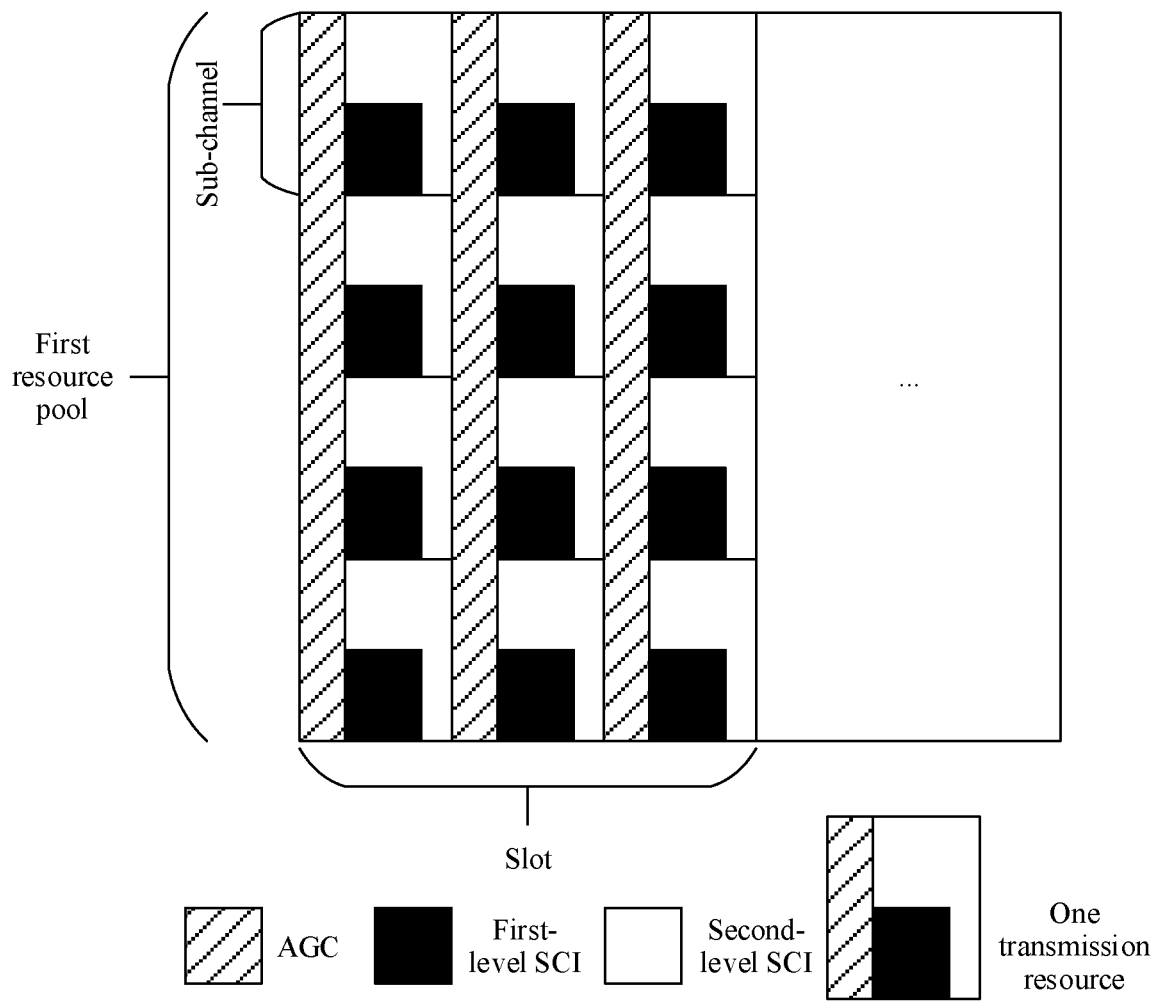
FIG. 5 is a schematic diagram of a configuration of a dedicated resource pool according to an embodiment of this application.

In a possible implementation, as shown in FIG. 5, one slot includes 14 symbols, and three transmission resources may be configured in the slot. The three transmission resources are sequentially referred to as a first transmission resource, a second transmission resource, and a third transmission resource from left to right. Symbols occupied by the foregoing three transmission resources may be the same or different. This is not limited. In some embodiments, the first transmission resource in the three transmission resources may occupy four symbols, and the second transmission resource and the third transmission resource each may occupy five symbols. Optionally, the first symbol occupied by the foregoing three transmission resources may be an AGC symbol, and is used by the receiver to perform AGC adjustment. In FIG. 5, for a symbol used for AGC adjustment in each transmission resource, refer to a long bar filled with slashes. Based on a time domain configuration in this example, three transmission resources are configured in one slot. For example, if it is set that the entire first resource pool includes four sub-channels, and one transmission resource occupies one sub-channel, the entire first resource pool includes 12 transmission resources in one slot.

It should be noted that a trigger message and/or a coordination message are/is usually transmitted by using SCI. The SCI may be classified into first-level SCI and second-level SCI. Therefore, each transmission resource may be specifically classified into a resource for transmitting AGC, a resource for transmitting the first-level SCI, a resource for transmitting the second-level SCI, and the like. For details, refer to FIG. 5.

In some embodiments, a slot occupied by the first resource pool in time domain may be defined in a bitmap manner. For example, $(b_0, b_1, \ldots, b_{L_{bitmap}-1})$ may be used to indicate a time domain configuration of the first resource pool, and $L_{bitmap}$, indicates a length of a bitmap. When $b_k=1$, it indicates that the slot belongs to the first resource pool, or when $b_k=0$, it indicates that the slot does not belong to the first resource pool.

Figure 6:
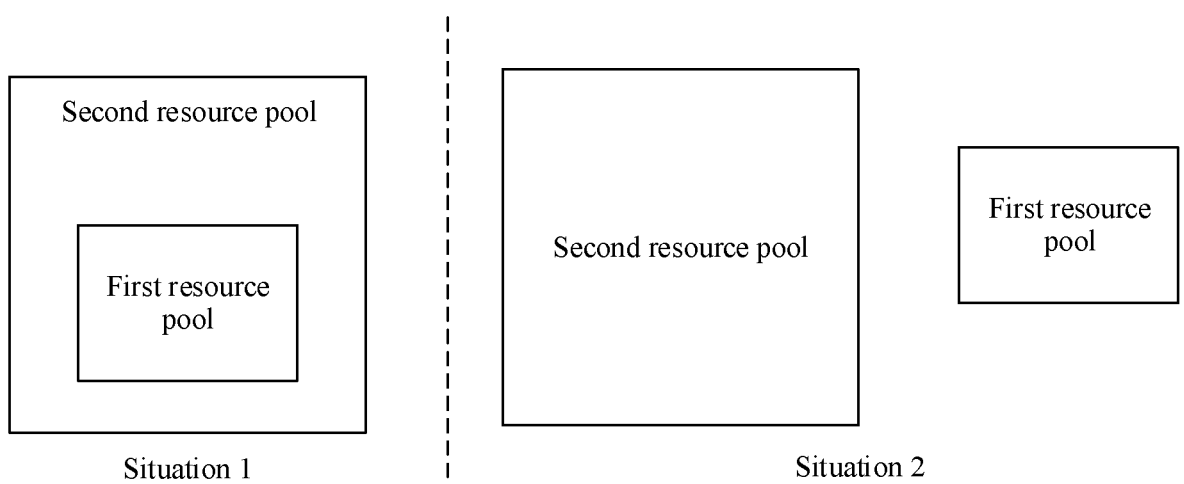
FIG. 6 is a schematic diagram of configuring a dedicated resource pool and an SL resource pool according to an embodiment of this application.

As shown in FIG. 6, the time domain configuration of the first resource pool may be based on the existing second resource pool. In other words, all time domain resources in the first resource pool belong to the second resource pool. Alternatively, the time domain configuration of the first resource pool may be independent of the second resource pool. In other words, time domain resources occupied by the first resource pool and the second resource pool do not overlap. Alternatively, the time domain configuration of the first resource pool partially overlaps with the second resource pool. To be specific, some time domain resources of the first resource pool belong to the second resource pool, but the other time domain resources do not belong to the second resource pool. This case is not depicted illustratively in FIG. 6.

Figure 7:
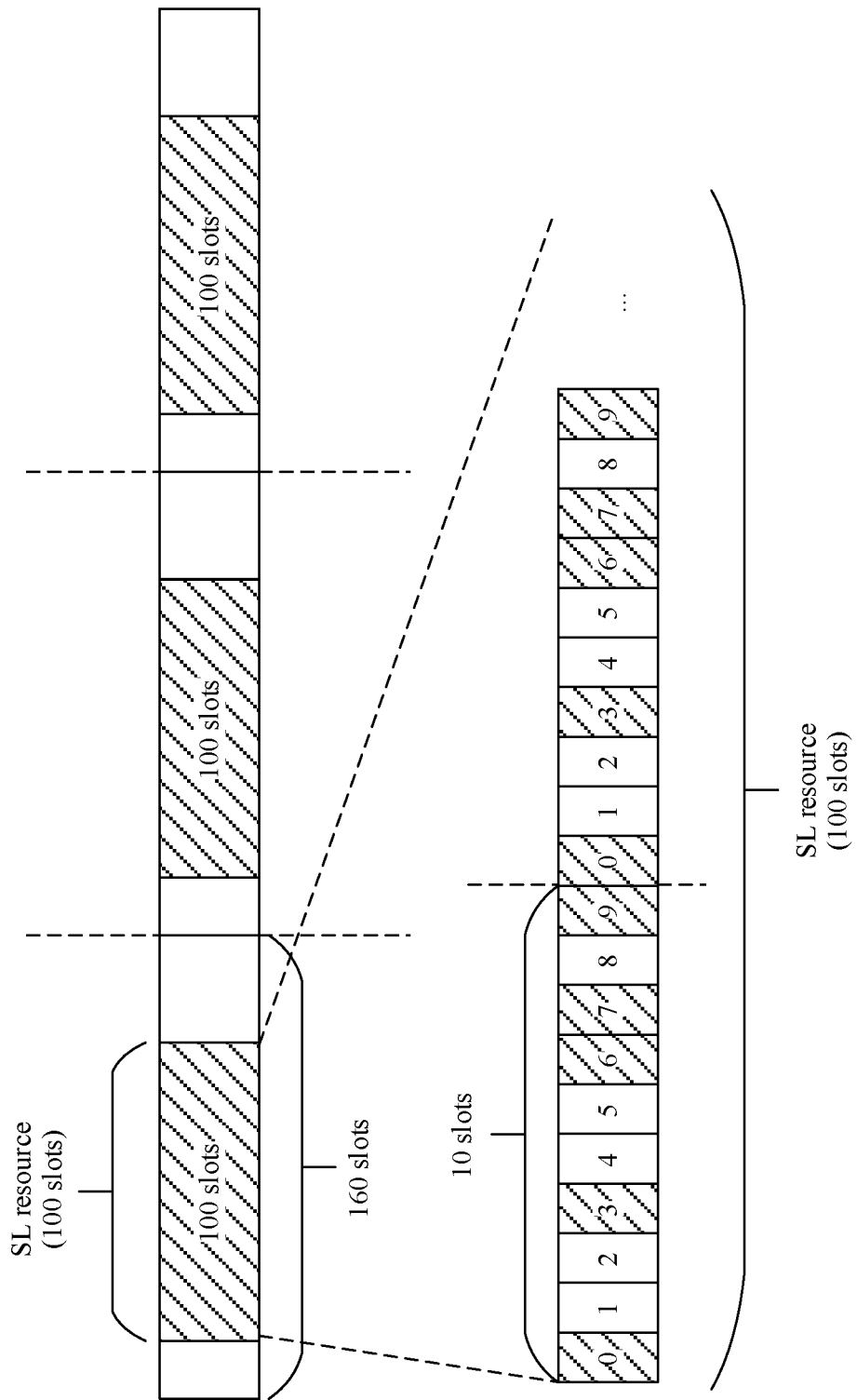
FIG. 7 is a schematic diagram of co-configuring a dedicated resource pool and an SL resource pool according to an embodiment of this application.

In some embodiments, as shown in FIG. 7, when the time domain configuration of the first resource pool is a part of the second resource pool, it is assumed that a length of a configuration periodicity bitmap of the second resource pool is $L_{bitmap}=160$. In other words, the second resource pool uses 160 slots as a configuration periodicity. There are 100 slots that belong to the second resource pool, and the first resource pool may be configured in the 100 SL resources. A length of a bitmap of the first resource pool is defined as $L_{bitmap'}=10$ and $(b_0, b_1, \ldots, b_{L_{bitmap'}-1})=1001001101$. In this case, every ten slots of the existing second resource pool may be considered as one group, and there are 10 groups in total. The first, the fourth, the seventh, the eighth, and the tenth resources in each group may be used as time domain resources in the first resource pool. With reference to the example in FIG. 5, each slot includes 12 transmission resources. In this case, a group of first resource pool configurations includes 5×12=60 transmission resources in total.

Figure 8:
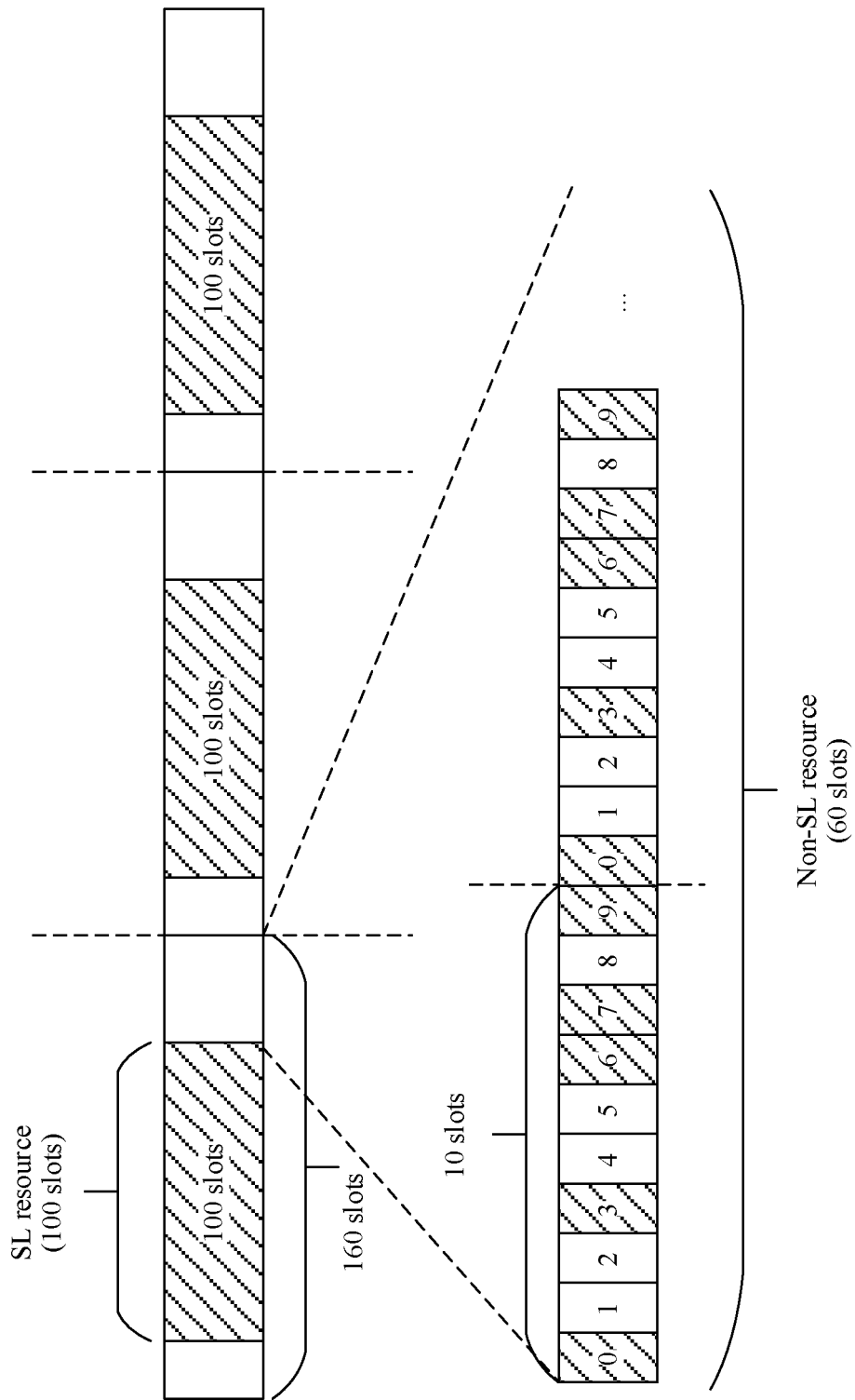
FIG. 8 is a schematic diagram of separately configuring a dedicated resource pool according to an embodiment of this application.

In some other embodiments, as shown in FIG. 8, when the first resource pool and the existing second resource pool are independently configured in time domain, it is assumed that a length of a bitmap of the existing second resource pool is $L_{bitmap}=160$, where there are 100 slots that belong to the second resource pool and there are 60 slots that do not belong to the second resource pool. In time domain, the first resource pool may be configured in the 60 slots that do not belong to the second resource pool. A length of the bitmap of the first resource pool is defined as $L_{bitmap'}=10$ and $(b_0, b_1, \ldots, b_{L_{bitmap'}-1})=1001001101$. In this case, every ten slots in the 60 slots that do not belong to the second resource pool may be considered as one group, and there are six groups in total. The first, the fourth, the seventh, the eighth, and the tenth resources in each group may be used as time domain resources in the first resource pool. With reference to the example in FIG. 5, each slot includes 12 transmission resources. A group of first resource pool configurations includes 5×12=60 transmission resources in total.

Optionally, one slot in the first resource pool may include a plurality of transmission resources, and the first symbol of each transmission resource is used for AGC. Therefore, when the first resource pool and the second resource pool are subject to frequency division multiplexing, a transmission power of a transmission signal in the second resource pool changes, and a terminal device in the second resource pool cannot normally perform receiving.

Figure 9:
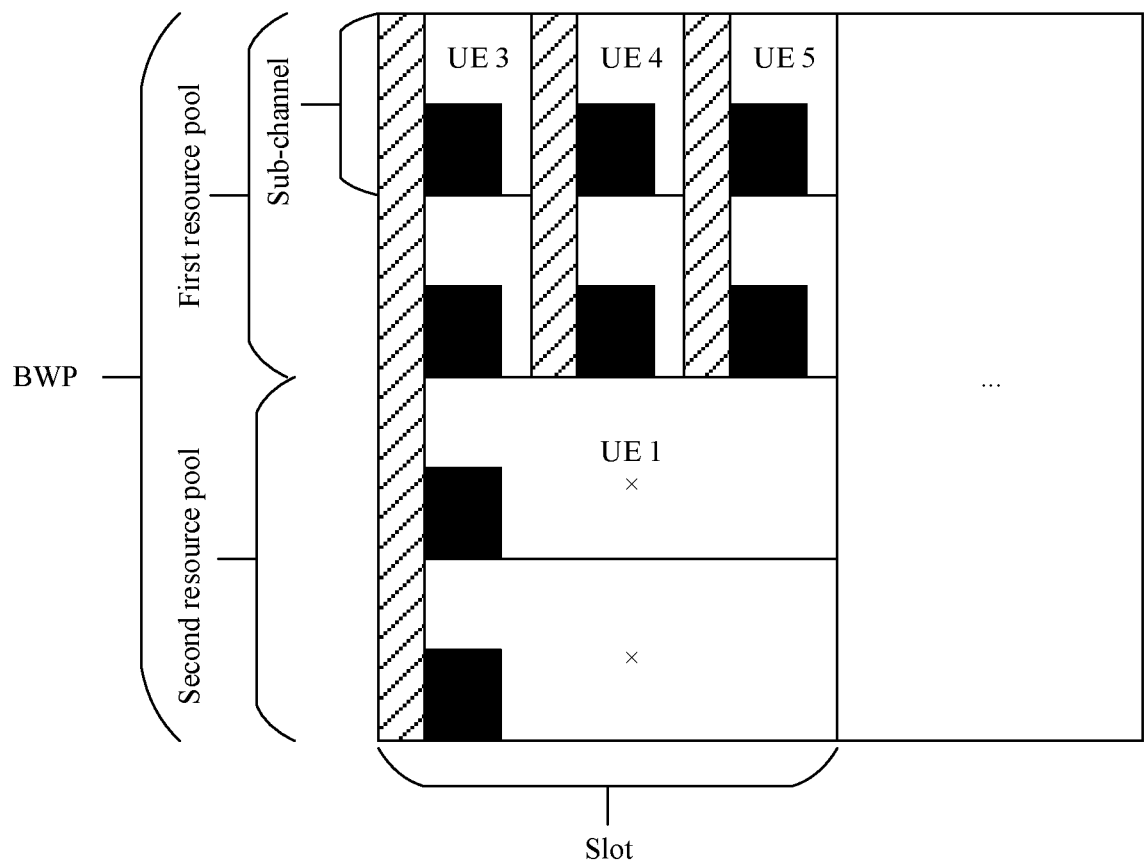
FIG. 9 is a schematic diagram in which a dedicated resource pool and an SL resource pool are subject to frequency division multiplexing according to an embodiment of this application.

As shown in FIG. 9, it is assumed that one bandwidth part (BWP) includes two resource pools. One of the two resource pools is the first resource pool used to transmit a trigger message and/or a coordination message, and one slot in the first resource pool may include three transmission resources. Each transmission resource occupies some symbols of one slot in time domain. UE-3, UE-4, and UE-5 respectively perform communication on the three transmission resources. The other resource pool is a resource pool used for sidelink transmission in a current technology, namely, the second resource pool.

It is assumed that the first resource pool and the second resource pool are subject to frequency division multiplexing, and the first resource pool and the second resource pool occupy a same time domain resource. In this case, when the UE-4 and the UE-5 send data on a symbol in the middle of a slot, because the first resource pool and the second resource pool occupy the same time domain resource, a receive power of UE-2 changes in one slot. When receiving data sent by UE-1, the UE-2 performs AGC only on the first symbol. Therefore, the UE-2 expects that the receive power in the entire slot is constant. However, the UE-4 and the UE-5 send data on a symbol in the middle of a slot, and consequently, the receive power in the entire slot changes. Therefore, when the UE-2 does not perform additional AGC processing, the UE-2 fails to perform receiving. Therefore, frequency division multiplexing between the first resource pool and the second resource pool should be avoided. In other words, the first resource pool and the second resource pool should be subject to time division multiplexing.

It can be learned from the foregoing that, in the first resource pool configuration that is used to transmit a trigger message and/or a coordination message and that is proposed in this embodiment of this application, one or more transmission resources is/are allowed to be configured in one slot. In other words, each transmission resource occupies some or all symbols of one slot in time domain. According to the method, transmission resources can be effectively used, and resource waste can be avoided. In addition, interference caused by coordination signaling to SL data transmission is reduced, transmission collisions are reduced, and a delay and reliability of system transmission are improved.

Embodiment 2

A communication method is provided by using the first resource pool configured for the trigger message and/or the coordination message in Embodiment 1. The method includes: A first terminal device determines a first transmission resource in the first resource pool, where the first resource pool is used to transmit a first message; and the first terminal device sends the first message to a second terminal device by using the first transmission resource.

For ease of understanding, in the following embodiments, an example in which the first terminal device is coordinating UE, the second terminal device is transmitting UE, the first message is a coordination message, and the second message is a trigger message is used for description. A relationship between the transmitting UE, the coordinating UE, and receiving UE is as follows: SL communication is performed between the transmitting UE and the receiving UE, a third message may be transmitted between the transmitting UE and the receiving UE by using a resource in a second resource pool, and the third message may be carried on at least one channel of a PSCCH, a PSSCH, or a PSFCH. If the transmitting UE needs assistance from the coordinating UE to determine the resource that is used for sending the third message and that is in the second resource pool, the coordinating UE may assist the transmitting UE in sensing an available idle resource in the second resource pool and/or a resource reserved by another UE, and send a sensing result to the transmitting UE in a form of a coordination message. Alternatively, the coordinating UE may send a resource that needs to be sent or a resource that needs to be received by the coordinating UE to the transmitting UE in the form of a coordination message. The coordinating UE may be the receiving UE, another UE near the receiving UE, or the like, or another UE. This is not limited in this application.

Figure 10:
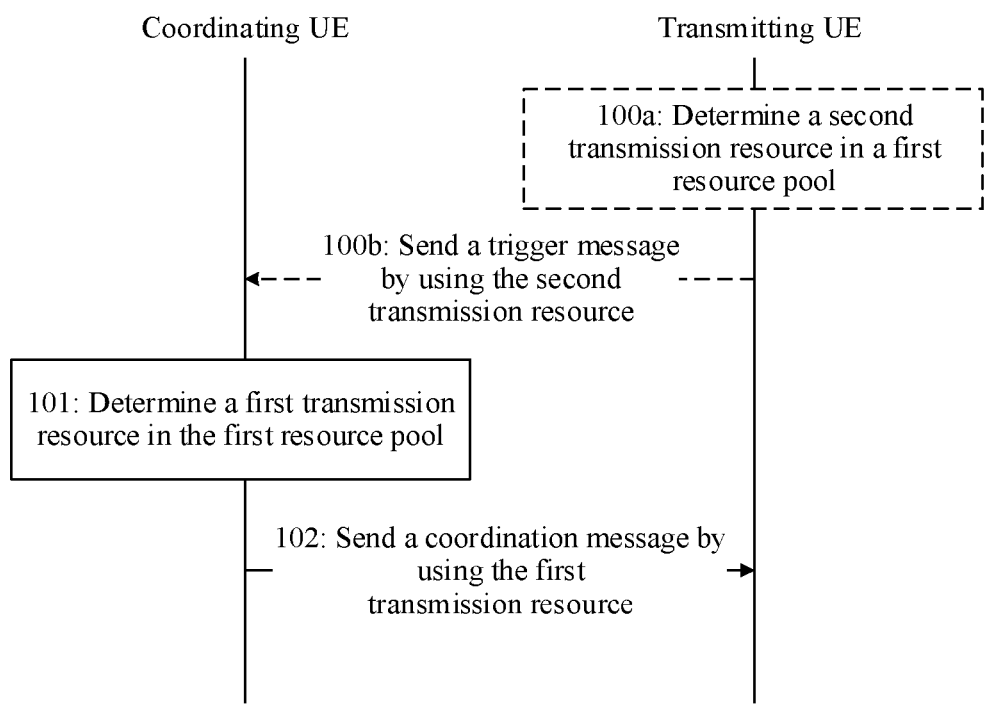
FIG. 10 is a schematic diagram of a communication method according to an embodiment of this application.

As shown in FIG. 10, a flowchart of a communication method is provided, including at least the following steps.

Step 101: Coordinating UE determines a first transmission resource in a first resource pool.

Step 102: The coordinating UE sends a coordination message to transmitting UE by using the first transmission resource.

It should be noted that the method shown in the procedure in FIG. 10 may be applied to the explicit trigger-based coordination mechanism shown in FIG. 2a, or may be applied to the non-explicit trigger-based coordination mechanism shown in FIG. 2b. If the method shown in the procedure in FIG. 10 is applied to the explicit trigger-based coordination mechanism shown in FIG. 2a, before step 101, the method may further include the following steps.

Step 100a: Transmitting UE determines a second transmission resource in a first resource pool.

Step 100b: The transmitting UE sends a trigger message to coordinating UE by using the second transmission resource. When receiving the trigger message, the coordinating UE sends the coordination message to the transmitting UE.

In this embodiment of this application, the trigger message is used by the coordinating UE to determine a coordination message, the coordination message is used by the transmitting UE to determine a third transmission resource in a second resource pool, and the third transmission resource is used by the transmitting UE to send the third message. The third message is carried on at least one channel of a PSCCH, a PSSCH, or a PSFCH.

For example, SL communication is performed between UE 1 and UE 2. The UE 1 is used as a transmit end, and the UE 2 is used as a receive end. It is assumed that the UE 1 needs coordination from another UE, to determine a transmission resource in the second resource pool. The UE 1 may serve as transmitting UE, and coordinating UE may be the UE 2, or may be another UE. This is not limited. For example, the coordinating UE is UE 3. The UE 3 may first determine a transmission resource in the first resource pool, and send a coordination message to the transmitting UE, that is, to the UE 1, on the transmission resource. The UE 1 may determine an available resource in the second resource pool based on the coordination message, and send an SL message to the UE 2 by using the available resource. The SL message is the third message.

It should be noted that, for the trigger message, a transmit end is the transmitting UE, and a receive end is the coordinating UE. For the coordination message, a transmit end is the coordinating UE, and a receive end is the transmitting UE. In the following embodiments, how the transmit end determines the transmission resource in the first resource pool configured for the trigger message and/or the coordination message is described. In addition, how the receive end receives a related message in the transmission resource is described.

Example 1

1. A process in which the transmit end determines the transmission resource in the first resource pool configured for the trigger message and/or the coordination message.

The transmit end determines an index of the transmission resource based on an index of the transmit end and/or an index of the receive end. In the first resource pool, the transmission resource corresponding to the index is a resource used by the transmit end to send the trigger message and/or the coordination message.

For example, the transmit end may perform a modulo operation on a total quantity of a group of transmission resources in the first resource pool by using a transmit end ID and a receive end ID, to determine the index of the transmission resource. For example, C-ID=(S-ID+D-ID) mod(N×M×K), where C-ID represents the index of the transmission resource, S-ID represents the index of the transmit end, D-ID represents the index of the receive end, mod represents the modulo operation, and N×M×K represents the total quantity of a group of transmission resources in the first resource pool. Transmission resources in the first resource pool may be sorted in a sequence of frequency domain first and then time domain, or sorted in a sequence of time domain first and then frequency domain. The foregoing sorting sequence is merely used as an example, and is not limited in this application. Each transmission resource corresponds to an index. For example, one slot includes 12 transmission resources, and the transmission resources in the first resource pool are sorted in a sequence of frequency domain first and then time domain. For a sorting result of the transmission resources in the first resource pool, refer to FIG. 11. For example, in some embodiments, if the index of the C-ID determined by using the foregoing algorithm is 10, the transmit end may send a message by using the transmission resource whose index is 10 in FIG. 11. The message may be a trigger message, a coordination message, or the like. Details are not described again.

It should be noted that N×M×K represents the total quantity of a group of transmission resources in the first resource pool. The group of transmission resources may be defined as follows: The group of transmission resources refers to a total quantity of dedicated transmission resources included in a group of time domain bitmap configurations of the first resource pool. N represents a quantity of sub-channels included in one transmission resource in the first resource pool in frequency domain, M represents a quantity of slots configured for the first resource pool in a group of time domain bitmap configurations, and K represents a quantity of transmission resources configured in one slot. A time domain bitmap of the first resource pool may repeatedly appear in time domain based on a periodicity, and each group of bitmap configurations corresponds to one group of transmission resources. The foregoing example is still used. A length of the time domain bitmap of the first resource pool is defined as $L_{bitmap}=10$ and $(b_0, b_1, \ldots , b_{L_{bitmap}-1})=1001001101$. In this case, M=5 slots may be configured for the first resource pool in a group of time domain bitmap configurations of the first resource pool. The foregoing example is still used. One slot may include K=3 transmission resources, one transmission resource in the first resource pool includes N=4 sub-channels in frequency domain, and one group of transmission resources in the first resource pool includes N×M×K=4×5×3=60 transmission resources in total.

In some embodiments, for the trigger message, the transmit end is the transmitting UE, and the receive end is the coordinating UE. In this case, the index of the transmission resource of the trigger message is determined by an ID of the transmitting UE and an ID of the coordinating UE. The ID of the transmitting UE is an S-ID, and the ID of the coordinating UE is a D-ID. For the coordination message, the transmit end is the coordinating UE, the receive end is the transmitting UE. The index of the transmission resource of the coordination message is determined by an ID of the coordinating UE and an ID of the transmitting UE. The ID of the coordinating UE is an S-ID, and the ID of the transmitting UE is a D-ID.

Optionally, in another implementation, the ID of the transmitting UE may be fixedly used as the S-ID, and the ID of the coordinating UE may be fixedly used as the D-ID; or the ID of the transmitting UE may be fixedly used as the D-ID, and the ID of the coordinating UE may be fixedly used as the S-ID. For the transmitting UE and the coordinating UE, refer to descriptions in the foregoing method embodiments. In this implementation, the trigger message and the coordination message correspond to a same transmission resource. Because a probability that the trigger message and the coordination message are simultaneously sent is low, resource utilization can be improved in this manner.

It should be noted that, when the ID of the transmission resource is determined, the S-ID and the D-ID may be all of a device ID of the UE, or may be a part of a device ID of the UE. Optionally, the ID of the transmission resource is determined by using a partial ID length of the device ID of the UE, so that complexity of blind detection can be reduced. For example, the ID of the transmission resource may be determined by using the first K1 bits, the last K1 bits, or the middle K1 bits of the S-ID, or the first K2 bits, the last K2 bits, or the middle K2 bits of the D-ID. Values of K1 and K2 are positive integers, and values of K1 and K2 are the same or different. In some embodiments, for example, the index of the transmission resource may be determined by separately using the first four bits of the S-ID and the first four bits of the D-ID. For example, the first four bits of the ID of the transmitting UE are 0010, and the first four bits of the ID of the coordinating UE are 0011. In this case, the index of the transmission resource is C-ID=(00100011)mod(60)=35.

Figure 12:
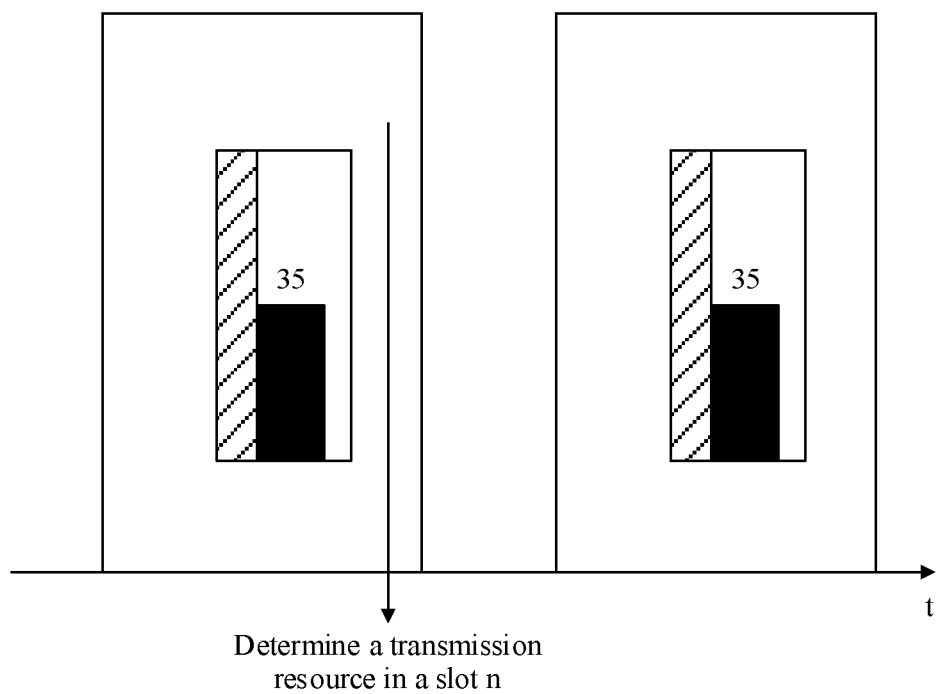
FIG. 12 is a schematic diagram of a slot n and a transmission resource index according to an embodiment of this application.

It should be noted that when the index of the transmission resource is determined in the foregoing manner, a moment at which the transmit end determines the transmission resource for sending the trigger message or the coordination message may be located after an actual transmission resource. In this case, the transmit end may send the trigger message or the coordination message on a transmission resource that corresponds to a same index and that is in a next group of transmission resources closest to a current slot. As shown in FIG. 12, the transmitting UE starts to determine a transmission resource in a slot n, and obtains, based on a mapping relationship between the S-ID and the D-ID, that an index of the transmission resource is 35. The slot n is located after the transmission resource whose index is 35 in a current group of transmission resources. Therefore, a transmit end may send a trigger message or a coordination message on a transmission resource whose index is 35 in a next group of transmission resources.

It should be noted that in descriptions of this embodiment of this application, an index, an ID, an identifier, and the like are not distinguished from each other, and may be interchanged with each other.

The index of the transmit end or the index of the receive end in this embodiment of this application may be an identifier of the device, for example, an identifier of the device for sending data or a service. All or a part of the identifier may be carried at a physical layer. Specifically, a source ID and a destination ID that are carried in second-level SCI are used as examples.

2. A process in which the receive end determines the transmission resource in the first resource pool.

The receive end needs to be discussed in two cases. In a first case, if the receive end has learned information about the transmit end, the receive end may uniquely determine a transmission resource on which a related message needs to be received. In a second case, if the receive end does not learn information about the transmit end, the receive end may not uniquely determine a transmission resource for receiving a related message, and needs to perform receiving on a plurality of transmission resources.

In the first case, the receive end has learned the information about the transmit end. For example, a link has been established or was established between the receive end and the transmit end, and the receive end may obtain an index ID of a transmit end device. In this case, the receive end determines the index of the transmission resource based on the index ID of the transmit end device and an index ID of a receive end device. In the first resource pool, the transmission resource corresponding to the index is a transmission resource used to transmit the trigger message or the coordination message. A specific manner is similar to the foregoing manner. The receive end may perform a modulo operation on a total quantity of a group of transmission resources by using the index ID of the transmit end device and the index ID of the receive end device, to determine an index of the transmission resource used to receive the trigger message or the coordination message in the first resource pool. When the receive end is the coordinating UE, the receive end needs to determine a corresponding index of a transmission resource based on the ID of the receive end and the ID of the transmitting UE, and receive the trigger message. When the receive end is the transmitting UE, the transmitting UE needs to determine a corresponding index of a transmission resource based on the ID of the transmitting UE and the ID of the coordinating UE, and receive the coordination message.

In the second case, the receive end does not learn the information about the transmit end. For example, no link is established or was established between the receive end and the transmit end, and the receive end cannot obtain the index ID of the transmit end device. In this case, the receive end needs to perform blind detection on all possible transmission resources related to the index ID of the receive end device. For example, the receive end needs to determine an index of at least one possible transmission resource based on an index ID of a device of the receive end. In the first resource pool, the at least one transmission resource corresponding to the index of the at least one transmission resource is a transmission resource on which the receive end needs to receive the trigger message or the coordination message.

For example, an index of the transmission resource on which the receive end needs to receive the trigger message or the coordination message may meet the following formula: C-ID=(D-ID+$2^n$j)mod(M×N×K), where C-ID represents the index of the transmission resource on which the receive end needs to receive the trigger message or the coordination message, D-ID represents the index of the receive end, n represents a quantity of bits included in an index ID of a transmitting device, M×N×K represents the total quantity of the group of transmission resources, and a value of j is a positive integer ranging from 0 to $2^n-1$. For example, the device index ID of the receiving UE includes four bits, and the four bits are specifically 0011; and the index ID of the transmitting device includes four bits. In this case, the index of the transmission resource on which the receive end needs to perform receiving is (3+16j)mod(60), where j=0, 1, 2, . . . , 15. For example, when a value of j ranges from 0 to 15, one transmission resource index may be separately calculated. The 16 values of j correspond to 16 transmission resources. The receive end blindly detects the trigger message or the coordination message on the 16 transmission resources. If the trigger message or the coordination message is successfully received on a transmission resource in the foregoing 16 transmission resources, the index ID of the transmitting device may be determined based on a time-frequency location of the transmission resource.

In this embodiment of this application, a specific mapping manner of the transmission resource in the first resource pool is provided. The transmission resource may be implicitly determined by performing a modulo operation on the index of the transmission resource, the ID of the transmitting UE, the ID of the coordinating UE, and the quantity of the group of transmission resources. Therefore, the transmitting UE or the coordinating UE does not need to additionally determine, according to a sensing reservation procedure, a resource for sending the trigger message or the coordination message, so that a power of the UE can be reduced. This achieves an energy saving effect, and is especially applicable to a terminal device whose power is limited. In addition, system complexity and interference enhancement that are caused by the sensing reservation process may be avoided.

Example 2

1. A process in which the transmit end determines the transmission resource in the first resource pool configured for the trigger message and/or the coordination message.

Figure 13:
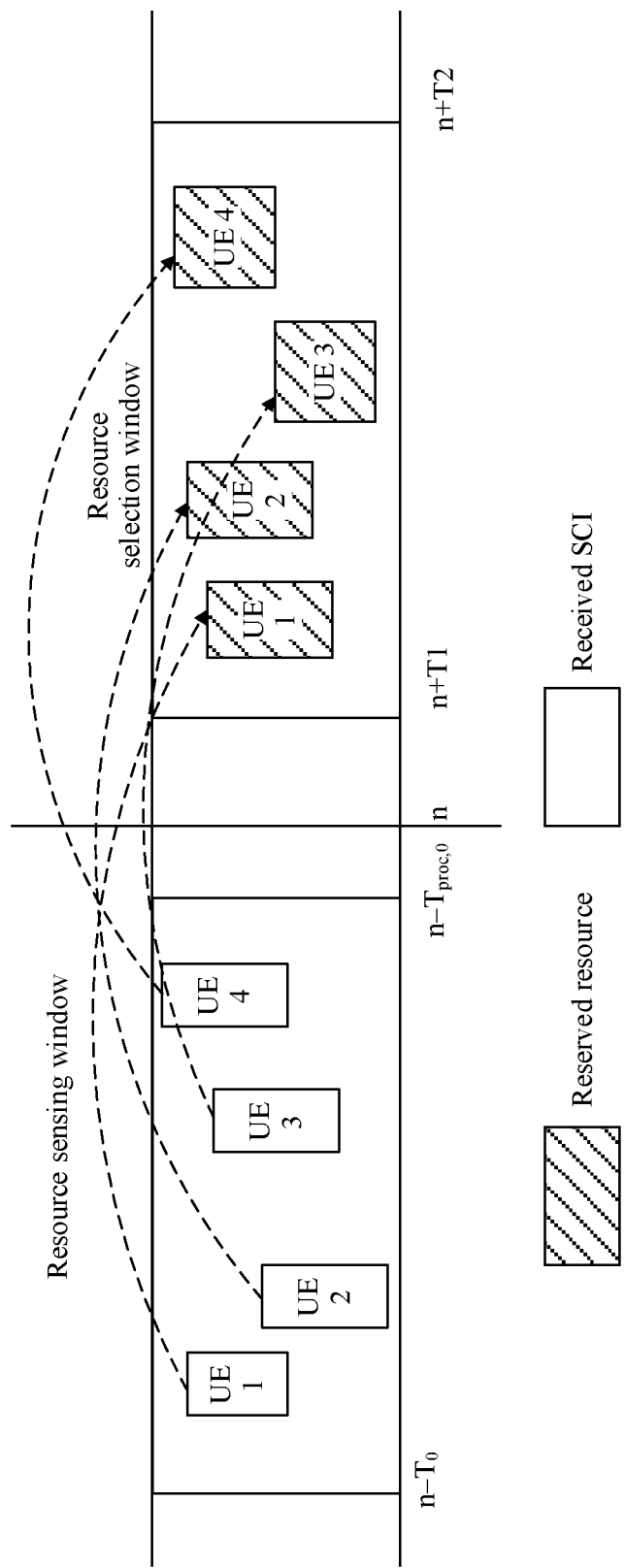
FIG. 13 is a schematic diagram of a resource sensing window and a resource selection window according to an embodiment of this application.

The transmit end determines, based on a sensing result in the first resource pool, a resource that can be used to transmit the trigger message or the coordination message. Specifically, the transmit end may autonomously select, in a resource selection window based on a result obtained through sensing performed by the transmit end, a transmission resource for communication. In this case, the transmit end may alternatively be referred to as sensing UE. A selection method is similar to a procedure in which UE autonomously selects a resource in a current technology. ($t_0^{SL}$, $t_1^{SL}$, $t_2^{SL}$, . . . , $t_{MAX}^{SL}$) is defined as a slot set that belongs to the first resource pool. As shown in FIG. 13, it is assumed that sensing UE triggers resource selection in a slot n, and the sensing UE continuously senses all remaining slots in all slots that belong to the first resource pool and that are in a window other than a slot in which the sensing UE performs transmission. Next, the sensing UE excludes, based on a sensing result, a resource that has been reserved by another UE from all the slots that belong to the first resource pool and that are in the resource selection window. Then, transmitting UE reports, to a higher layer of a terminal, a candidate resource set obtained after exclusion, and the higher layer determines a final resource for sending a trigger message and/or a coordination message.

A specific resource exclusion procedure is as follows:

(1) As shown in FIG. 13, the resource selection window is defined as a slot corresponding to [n+$T_1$, n+$T_2$] after n is triggered by resource selection. It is assumed that a quantity of sub-channels included in frequency domain resources in a first resource pool is $N_{subCH}$, and a sub-channel set corresponding to the frequency domain resources in the first resource pool is $\mathcal{S}=\{S_0, S_1, \ldots, S_{N_{subCH}-1}\}$. A candidate resource $R_{x,y}$ is defined as a sub-channel set that is located in a slot $t_y^{SL}$ in time domain, where the slot belongs to the first resource pool and is in a resource selection window [n+$T_1$, n+$T_2$], and that is located in a sub-channel x+j in frequency domain, where j=0, . . . , $L_{subCH}-1$. In other words, the candidate resource is represented as a consecutive sub-channel set whose length is equal to $L_{subCH}$ in frequency domain, where $L_{subCH}$ is a quantity of sub-channels occupied by a trigger message or a coordination message corresponding to to-be-transmitted data. Therefore, a total quantity of candidate resources in each slot is $N_{subCH}-L_{subCH}+1$. Any consecutive sub-channel set that meets the foregoing condition and whose length is equal to $L_{subCH}$ is considered as a candidate resource $R_{x,y}$. A quantity of all candidate resources is $M_{total}$.

Figure 14:
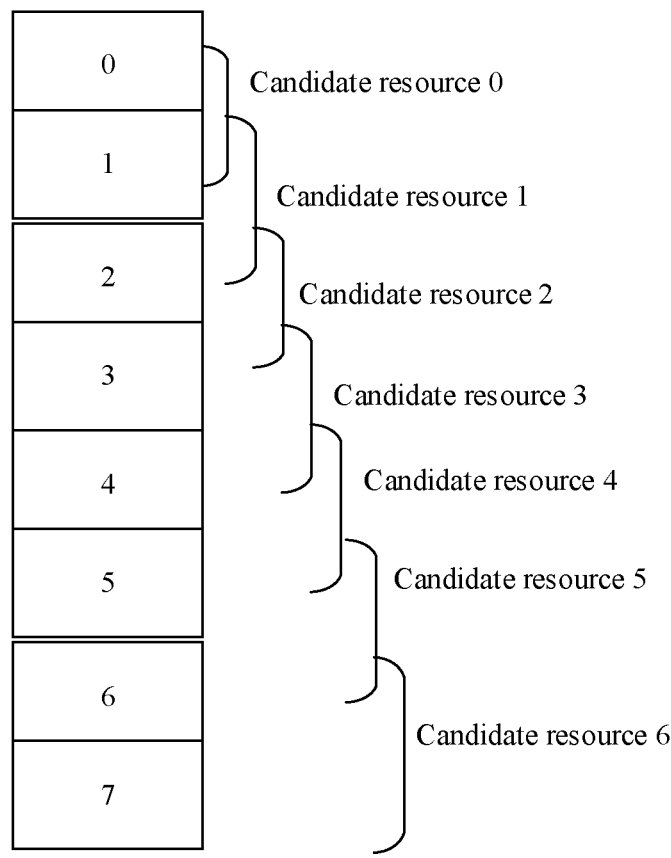
FIG. 14 is a schematic diagram of candidate resources according to an embodiment of this application.

As shown in FIG. 14, it is assumed that a maximum quantity $N_{subCH}$ of sub-channels in a frequency domain resource pool is 8, a corresponding sub-channel set is $\mathcal{S}=\{S_0, S_1, \ldots, S_7\}$, and a quantity $L_{subCH}$ of sub-channels occupied by a to-be-transmitted trigger message or coordination message is 2. In this case, a total quantity $N_{subCH}-L_{subCH}+1$ of candidate resources in each slot is equal to 7.

(2) As shown in FIG. 13, a resource sensing window may be defined as $[n-T_0, n-T_{proc,0}^{SL}]$ where $T_0$ is configured by a higher-layer parameter t0_SensingWindow, and $T_{proc,0}^{SL}$ is determined according to Table-1. $\mu_{SL}$ is a sub-carrier spacing (SCS) configuration corresponding to an SL BWP, and is determined according to Table-2.

TABLE 1

| $T_{proc,0}^{SL}$ | |
|---|---|
| $\mu_{SL}$ | $T_{proc,0}^{SL}$ [slots] |
| 0 | 1 |
| 1 | 1 |
| 2 | 2 |
| 3 | 4 |

TABLE 2

| Relationship between $\mu_{SL}$ and sub-carrier spacing | |
|---|---|
| $\mu_{SL}$ | $\Delta f = 2^\mu \cdot 15 [\text{kHz}]$ |
| 0 | 15 |
| 1 | 30 |
| 2 | 60 |
| 3 | 120 |
| 4 | 240 |

(3) The threshold $Th_{prioTX,prioRX}$ is defined as a function of a priority corresponding to data indicated in received SCI and a priority corresponding to to-be-sent data of the sensing UE.

(4) A set including all $M_{total}$ candidate resources is defined as $S_A$.

(5) The candidate resource $R_{x,y}$ should be excluded from the set $S_A$ if the candidate resource $R_{x,y}$ meets all the following conditions:

the sensing UE does not sense a slot $t_m^{SL}$, that is, the sensing UE has performed transmission in the slot $t_m^{SL}$; and there is an integer j meeting $y+j\times P'_{rsvp\_TX}=m+q\times P'_{rsvp\_RX}$, where q=1, 2, ..., Q, j=0, 1, ..., $C_{resel}-1$, and $P'_{rsvp\_Tx}$ is a logical value obtained by converting a resource reservation interval $P_{rsvp\_TX}$ of the sensing UE from an interval in a millisecond (ms) unit into an interval in a logical slot unit, and may also be referred to as a logical periodicity; the resource reservation interval $P_{rsvp\_TX}$ may be determined by a higher-layer parameter sl-ResourceReservePeriodList; $P'_{rsvp\_RX}$ is a logical value obtained by converting a resource reservation interval $P_{rsvp\_RX}$ indicated in received SCI of another terminal into an interval in a logical slot unit; if $P_{rsvp\_RX}<T_{scal}$ and $n'-m\leq P'_{rsvp\_RX}$, $$Q = \left\lceil \frac{T_{scal}}{P_{rsvp\_RX}} \right\rceil;$$

otherwise, Q=1; if the slot n belongs to the first resource pool, $t_{n'}^{SL}=n$; otherwise, $t_{n'}^{SL}$ is a first slot that belongs to the first resource pool and that is after the slot n; and $T_{scal}$ is an interval corresponding to a resource selection window length $T_2$, and is in an ms unit.

(6) The candidate resource $R_{x,y}$ should be excluded from the set $S_A$ if the candidate resource $R_{x,y}$ meets all the following conditions:

the sensing UE receives SCI in a slot $t_m^{SL}$, where a field "Resource reservation period" (if the field "Resource reservation period" exists) in the SCI indicates a value $P_{rsvp\_RX}$, and a field "Priority" in the SCI indicates a value $prio_{RX}$; the value $P_{rsvp\_RX}$ is a physical periodicity resource reservation interval of a PSSCH corresponding to the SCI, and is in a millisecond (ms) unit; and the value $prio_{RX}$ is a priority value of the PSSCH corresponding to the SCI;

a measurement result of a reference signal received power (RSRP) of a trigger message or a coordination message determined by using the SCI is higher than a threshold $Th_{prioTX,prioRX}$ where the threshold $Th_{prioTX,prioRX}$ is a function of a priority corresponding to data indicated in the received SCI and a priority corresponding to to-be-sent data of the sensing UE; and a time-frequency resource determined by the SCI received by the sensing UE in the slot $t_m^{SL}$ overlaps a candidate resource $R_{x,y+j\times P'_{rsvp\_TX}}$, or when the field "Resource reservation period" in the SCI exists, a time-frequency resource determined by SCI expected to be received by the sensing UE in a slot $t_{m+q\times P'_{rsvp\_TX}}^{SL}$ overlaps the candidate resource $R_{x,y+j\times P'_{rsvp\_TX}}$, where q=1, 2, ..., Q, j=0, 1, ..., $C_{resel}-1$, and $P'_{rsvp\_TX}$ is a logical value obtained by converting a resource reservation interval $P_{rsvp\_TX}$ of the sensing UE from an interval in a millisecond (ms) unit into an interval in a logical slot unit; the resource reservation interval is a parameter provided by a higher layer; $P'_{rsvp\_RX}$ is a logical value obtained by converting a resource reservation interval $P_{rsvp\_RX}$ indicated in the received SCI into an interval in a logical slot unit; if $P_{rsvp\_RX} \leq T_{scal}$ and $n'-m\leq P'_{rsvp\_Rx}$, $$Q = \left\lceil \frac{T_{scal}}{P_{rsvp\_RX}} \right\rceil;$$

otherwise, Q=1; if the slot n belongs to the first resource pool, $t_{n'}^{SL}=n$; otherwise, $t_{n'}^{SL}$ is a first slot that belongs to the first resource pool and that is after the slot n; $T_{scal}$ is a value obtained after a selection window length $T_2$ is converted into a length in a millisecond (ms) unit; and it should be understood that converting a value in a millisecond (ms) unit into a value in a logical slot unit indicates calculating a quantity of resources that are included in duration corresponding to the value and that are for sending a trigger message and/or a coordination message.

(7) If remaining candidate resources in the candidate resource set $S_A$ are less than X% of $M_{total}$, a preset RSRP threshold $Th_{prioTX,prioRX}$ is increased by 3 dB, and steps (4) to (6) are repeated. A configuration of X% is selected from a parameter configured by a higher layer or a predefined parameter.

(8) The sensing UE reports the candidate resource set $S_A$ to the higher layer, and the higher layer completes final resource selection from the set $S_A$.

The time-frequency resource determined by the sensing UE based on the received SCI is a reserved resource indicated by the SCI, and is located after a transmit slot of the SCI in time domain. Another UE sends a trigger message or a coordination message on the reserved resource. In an example shown in FIG. 13, Pieces of SCI sent by the UE 1 to the UE 4 respectively indicate reserved resources (a name of a corresponding transmitting terminal, for example, UE 1, is marked on the reserved resource) of the UE 1 to the UE 4. The reserved resources of the UE 1 to the UE 4 are located in a selection window. In this case, the sensing UE needs to exclude, from the candidate resource set $S_A$, candidate resources that overlap these reserved resources.

2. The receive end receives a trigger message or a coordination message in the first resource pool.

For example, the receive end performs blind detection on all transmission resources that may be used to transmit a trigger message or a coordination message in the first resource pool, and receives the trigger message, the coordination message, or the like.

It may be understood that in the foregoing methods provided in embodiments of this application, the methods provided in embodiments of this application are separately described from a perspective of interaction between the first terminal device and the second terminal device. To implement functions in the methods provided in the foregoing embodiments of this application, the first terminal and the second terminal may include a hardware structure and/or a software unit, and implement the foregoing functions in a form of the hardware structure, the software unit, or a combination of the hardware structure and the software unit. Whether one of the foregoing functions is performed by the hardware structure, the software unit, or the combination of the hardware structure and the software unit depends on particular applications and design constraint conditions of the technical solutions.

The methods provided in embodiments of this application are described above in detail with reference to FIG. 1 to FIG. 14. Apparatuses provided in embodiments of this application are described below in detail with reference to FIG. 15 and FIG. 16. It should be understood that descriptions of the apparatus embodiments correspond to descriptions of the method embodiments. Therefore, for content that is not described in detail, refer to the descriptions in the foregoing method embodiments.

Figure 15:
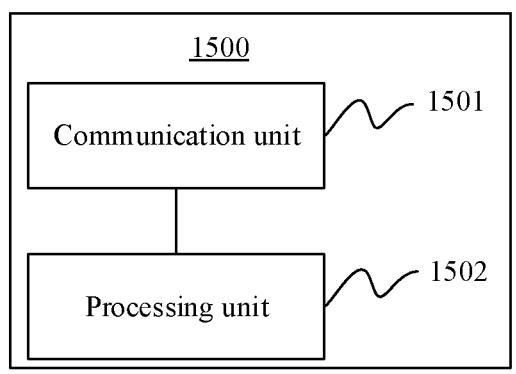
FIG. 15 is a schematic diagram of a structure of an apparatus according to an embodiment of this application.

FIG. 15 is a schematic block diagram of an apparatus 1500 according to an embodiment of this application. The apparatus 1500 is configured to implement functions of the first terminal device or the second terminal device in the foregoing methods. For example, the apparatus may be a software unit or a chip system. The chip system may include a chip, or may include a chip and another discrete component. The apparatus includes a communication unit 1501, and may further include a processing unit 1502. The communication unit 1501 may communicate with the outside. The processing unit 1502 is configured to perform processing, In an example, the apparatus 1500 is configured to implement a function of the first terminal device.

For example, the processing unit 1502 is configured to determine a first transmission resource in a first resource pool, where the first transmission resource is used to transmit a first message, each transmission resource in the first resource pool occupies some or all symbols of one slot in time domain, and each transmission resource in the first resource pool occupies one or more sub-channels in frequency domain. The communication unit 1501 is configured to send the first message to a second terminal device by using the first transmission resource.

Optionally, the processing unit 1502 is further configured to determine at least one transmission resource in the first resource pool, where the first resource pool is further used to transmit a second message. The communication unit 1501 is further configured to receive the second message from the second terminal device on the at least one transmission resource.

Optionally, the second message is used by the first terminal device to determine the first message, the first message is used by the second terminal device to determine a third transmission resource in a second resource pool, and the third transmission resource is used by the second terminal device to send a third message. The third message may be carried on at least one of a physical sidelink control channel PSCCH, a physical sidelink shared channel PSSCH, or a physical sidelink feedback channel PSFCH. Each transmission resource in the second resource pool occupies all symbols of one slot in time domain.

Optionally, a time domain start location and/or a quantity of occupied time domain symbols of each transmission resource in the first resource pool are/is preconfigured in the first terminal device, or the first terminal device determines a time domain start location and/or a quantity of occupied time domain symbols of each transmission resource based on configuration signaling from a network device.

Optionally, the configuration signaling is a system information block SIB, radio resource control RRC signaling, or physical layer control information.

Optionally, a first time domain symbol occupied by each transmission resource in the first resource pool is used for automatic gain control AGC adjustment performed by a receive end.

Optionally, the first resource pool and the second resource pool are subject to time division multiplexing.

Optionally, that the processing unit 1502 determines a first transmission resource in a first resource pool includes: determining, based on an index of the first terminal device and/or an index of the second terminal device, an index corresponding to the first transmission resource, where the transmission resource corresponding to the index in the first resource pool is a transmission resource used to send the first message.

Optionally, that the processing unit 1502 determines at least one transmission resource in a first resource pool includes: determining an index of the at least one transmission resource based on the index of the first terminal device, where the at least one transmission resource corresponding to the index in the first resource pool is a transmission resource used to receive the second message.

Optionally, that the processing unit 1502 determines at least one transmission resource in a first resource pool includes: determining an index of a second transmission resource based on the index of the first terminal device and the index of the second terminal device, where the transmission resource corresponding to the index in the first resource pool is a transmission resource used to receive the second message.

In another example, the apparatus 1500 may implement a function of the second terminal device.

For example, the processing unit 1502 is configured to determine at least one transmission resource in a first resource pool. The communication unit 1501 is configured to receive a first message from a first terminal device on the at least one transmission resource, where the first resource pool is used to transmit the first message, each transmission resource in the first resource pool occupies some or all symbols of one slot in time domain, and each transmission resource in the first resource pool occupies one or more sub-channels in frequency domain.

Optionally, the processing unit 1502 is further configured to determine a second transmission resource in the first resource pool, where the first resource pool is further used to transmit a second message. The communication unit 1501 is further configured to send the second message to the first terminal device by using the second transmission resource.

Optionally, the second message is used by the first terminal device to determine the first message, the first message is used by the second terminal device to determine a third transmission resource in a second resource pool, and the third transmission resource is used by the second terminal device to send a third message. The third message is carried on at least one of a physical sidelink control channel PSCCH, a physical sidelink shared channel PSSCH, or a physical sidelink feedback channel PSFCH. Each transmission resource in the second resource pool occupies all symbols of one slot in time domain.

Optionally, a time domain start location and/or a quantity of occupied time domain symbols of each transmission resource in the first resource pool are/is preconfigured in the second terminal device, or the second terminal device determines a time domain start location and/or a quantity of occupied time domain symbols of each transmission resource based on configuration signaling from a network device.

Optionally, the configuration signaling is a system information block SIB, radio resource control RRC signaling, or physical layer control signaling.

Optionally, a first time domain symbol occupied by each transmission resource in the first resource pool is used for automatic gain control AGC adjustment performed by a receive end.

Optionally, the first resource pool and the second resource pool are subject to time division multiplexing.

Optionally, that the processing unit 1502 determines at least one transmission resource in a first resource pool includes: determining, based on an index of the second terminal device, an index of a transmission resource used to receive the first message, where the transmission resource corresponding to the index in the first resource pool is a transmission resource used to receive the first message.

Optionally, that the processing unit 1502 determines at least one transmission resource in a first resource pool includes: determining an index of a first transmission resource based on an index of the second terminal device and an index of the first terminal device, where the transmission resource corresponding to the index in the first resource pool is a transmission resource used to receive the first message.

Optionally, that the processing unit 1502 determines a second transmission resource in the first resource pool includes: determining an index of the second transmission resource based on the index of the first terminal device and the index of the second terminal device, where the transmission resource corresponding to the index in the first resource pool is a transmission resource used to send the second message.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit.

It can be understood that in the foregoing embodiment, functions of the communication unit can be implemented by a transceiver, and functions of the processing unit can be implemented by a processor. The transceiver may include a transmitter and/or a receiver, to respectively implement functions of a sending unit and/or a receiving unit. Descriptions are provided below by way of example with reference to FIG. 16.

Figure 16:
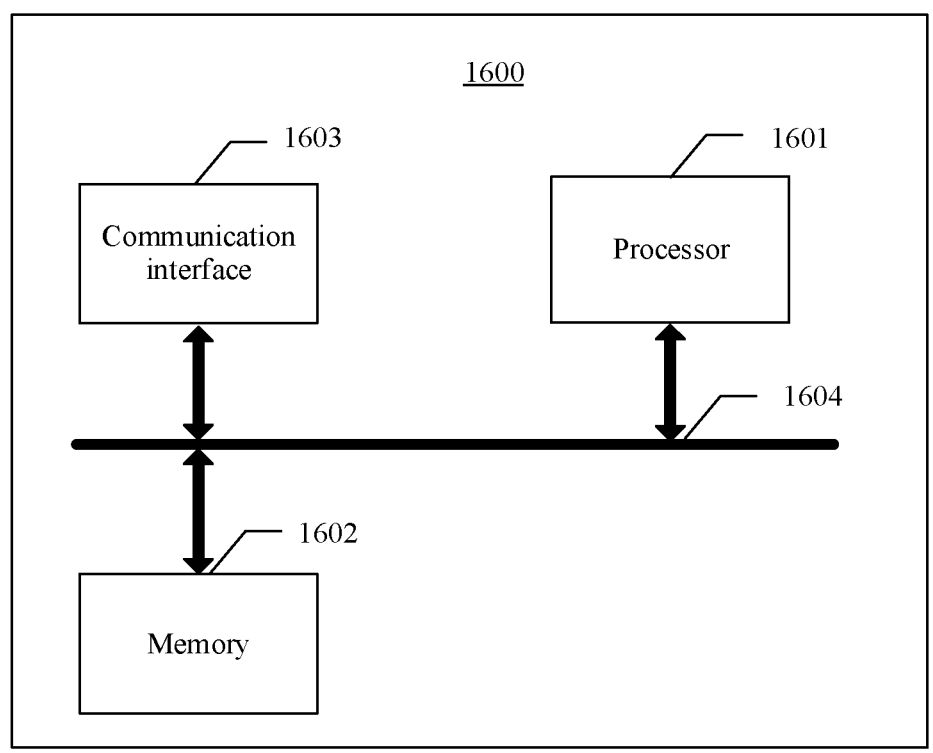
FIG. 16 is a schematic diagram of another structure of an apparatus according to an embodiment of this application.

FIG. 16 is a schematic block diagram of an apparatus 1600 according to an embodiment of this application. The apparatus 1600 shown in FIG. 16 may be an implementation of a hardware circuit of the apparatus shown in FIG. 15. For ease of description, FIG. 16 shows only main components of the communication apparatus.

The communication apparatus 1600 shown in FIG. 16 includes at least one processor 1601. The communication apparatus 1600 may further include at least one memory 1602 configured to store program instructions and/or data. The memory 1602 is coupled to the processor 1601. The coupling in this embodiment of this application may be indirect coupling or a communication connection between apparatuses, units, or modules in an electrical form, a mechanical form, or another form, and is used for information exchange between the apparatuses, the units, or the modules. The processor 1601 may cooperate with the memory 1602. The processor 1601 may execute the program instructions stored in the memory 1602, and at least one of the at least one memory 1602 may be included in the processor 1601.

The apparatus 1600 may further include a communication interface 1603. The communication interface 1603 is configured to communicate with another device through a transmission medium, so that the communication apparatus 1600 may communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

It should be understood that a connection medium between the processor 1601, the memory 1602, and the communication interface 1603 is not limited in this embodiment of this application. In this embodiment of this application, the memory 1602, the processor 1601, and the communication interface 1603 are connected through a communication bus 1604 in FIG. 16. The bus is represented by a thick line in FIG. 16. A connection manner between other components is merely an example for description, and is not limited. The bus may include an address bus, a data bus, a control bus, and the like. For ease of representation, in FIG. 16, only one thick line is used for representation, but it does not mean that there is only one bus, only one type of bus, or the like.

In an example, the apparatus 1600 is configured to implement a function of the first terminal device.

For example, the processor 1601 is configured to determine a first transmission resource in a first resource pool, where the first transmission resource is used to transmit a first message, each transmission resource in the first resource pool occupies some or all symbols of one slot in time domain, and each transmission resource in the first resource pool occupies one or more sub-channels in frequency domain. The communication interface 1603 is configured to send the first message to a second terminal device by using the first transmission resource.

Optionally, the processor 1601 is further configured to determine at least one transmission resource in the first resource pool, where the first resource pool is further used to transmit a second message. The communication interface

1603 is further configured to receive the second message from the second terminal device on the at least one transmission resource.

Optionally, the second message is used by the first terminal device to determine the first message, the first message is used by the second terminal device to determine a third transmission resource in a second resource pool, and the third transmission resource is used by the second terminal device to send a third message. The third message may be carried on at least one of a physical sidelink control channel PSCCH, a physical sidelink shared channel PSSCH, or a physical sidelink feedback channel PSFCH. Each transmission resource in the second resource pool occupies some or all symbols of one slot in time domain.

Optionally, a time domain start location and/or a quantity of occupied time domain symbols of each transmission resource in the first resource pool are/is preconfigured in the first terminal device, or the first terminal device determines a time domain start location and/or a quantity of occupied time domain symbols of each transmission resource based on configuration signaling from a network device.

Optionally, the configuration signaling is a system information block SIB, radio resource control RRC signaling, or physical layer control information.

Optionally, a first time domain symbol occupied by each transmission resource in the first resource pool is used for automatic gain control AGC adjustment performed by a receive end.

Optionally, the first resource pool and the second resource pool are subject to time division multiplexing.

Optionally, that the processor 1601 determines the first transmission resources in the first resource pool includes: determining, based on an index of the first terminal device and/or an index of the second terminal device, an index corresponding to the first transmission resource, where the transmission resource corresponding to the index in the first resource pool is a transmission resource used to send the first message.

Optionally, that the processor 1601 determines the at least one transmission resource in the first resource pool includes: determining an index of the at least one transmission resource based on the index of the first terminal device, where the at least one transmission resource corresponding to the index in the first resource pool is a transmission resource used to receive the second message.

Optionally, that the processor 1601 determines the at least one transmission resource in the first resource pool includes: determining an index of a second transmission resource based on the index of the first terminal device and the index of the second terminal device, where the transmission resource corresponding to the index in the first resource pool is a transmission resource used to receive the second message.

In an example, the apparatus 1600 is configured to implement a function of the second terminal device.

For example, the processor 1601 is configured to determine at least one transmission resource in a first resource pool. The communication interface 1603 is configured to receive a first message from a first terminal device on the at least one transmission resource, where the first resource pool is used to transmit the first message, each transmission resource in the first resource pool occupies some or all symbols of one slot in time domain, and each transmission resource in the first resource pool occupies one or more sub-channels in frequency domain.

Optionally, the processor 1601 is further configured to determine a second transmission resource in the first resource pool, where the first resource pool is further used to transmit a second message. The communication interface 1603 is further configured to send the second message to the first terminal device by using the second transmission resource.

Optionally, the second message is used by the first terminal device to determine the first message, the first message is used by the second terminal device to determine a third transmission resource in a second resource pool, and the third transmission resource is used by the second terminal device to send a third message. The third message is carried on at least one of a physical sidelink control channel PSCCH, a physical sidelink shared channel PSSCH, or a physical sidelink feedback channel PSFCH. Each transmission resource in the second resource pool occupies some or all symbols of one slot in time domain.

Optionally, a time domain start location and/or a quantity of occupied time domain symbols of each transmission resource in the first resource pool are/is preconfigured in the second terminal device, or the second terminal device determines a time domain start location and/or a quantity of occupied time domain symbols of each transmission resource based on configuration signaling from a network device.

Optionally, the configuration signaling is a system information block SIB, radio resource control RRC signaling, or physical layer control signaling.

Optionally, a first time domain symbol occupied by each transmission resource in the first resource pool is used for automatic gain control AGC adjustment performed by a receive end.

Optionally, the first resource pool and the second resource pool are subject to time division multiplexing.

Optionally, that the processor 1601 determines the at least one transmission resource in the first resource pool includes: determining, based on an index of the second terminal device, an index of a transmission resource used to receive the first message, where the transmission resource corresponding to the index in the first resource pool is a transmission resource used to receive the first message.

Optionally, that the processor 1601 determines the at least one transmission resource in the first resource pool includes: determining an index of a first transmission resource based on the index of the second terminal device and an index of the first terminal device, where the transmission resource corresponding to the index in the first resource pool is a transmission resource used to receive the first message.

Optionally, that the processor 1601 determines the second transmission resource in the first resource pool includes: determining an index of the second transmission resource based on the index of the first terminal device and the index of the second terminal device, where the transmission resource corresponding to the index in the first resource pool is a transmission resource used to send the second message.

Further, an embodiment of this application further provides a computer-readable storage medium, including a program. When the program is run by a processor, the methods in the foregoing method embodiments are performed.

A computer program product is provided. The computer program product includes computer program code. When the computer program code is run on a computer, the computer is enabled to implement the methods in the foregoing method embodiments.

A chip is provided, including a processor. The processor is coupled to a memory. The memory is configured to store a program or instructions. When the program or the instructions is/are executed by the processor, an apparatus is enabled to perform the methods in the foregoing method embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware in the processor and a software module.

In embodiments of this application, the memory may be a non-volatile memory, for example, a hard disk drive (HDD) or a solid-state drive (SSD), or may be a volatile memory, for example, a random access memory (RAM). The memory is any other medium that can be configured to carry or store expected program code in a form of instructions or a data structure and that can be accessed by a computer, but is not limited thereto. The memory in embodiments of this application may alternatively be a circuit or any other apparatus that can implement a storage function, and is configured to store program instructions and/or data.

All or some of the methods in embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A communication method, comprising:
   determining, by a first terminal device, a first transmission resource in a first resource pool, wherein each transmission resource in the first resource pool occupies some or all symbols of one slot in a time domain, and each transmission resource in the first resource pool occupies one or more sub-channels in a frequency domain; and
   sending, by the first terminal device, a first message to a second terminal device by using the first transmission resource, wherein the first transmission resource occupied by the first message is less than one slot.

2. The communication method according to claim 1, further comprising:
   determining, by the first terminal device, at least one transmission resource in the first resource pool; and
   receiving, by the first terminal device, a second message from the second terminal device on the at least one transmission resource.

3. The communication method according to claim 2, further comprising:
   determining, by the first terminal device, the first message based on the second message, wherein the first message is used by the second terminal device to determine a third transmission resource in a second resource pool, and the third transmission resource is used by the second terminal device to send a third message; and
   wherein the third message is carried on at least one of a physical sidelink control channel (PSCCH), a physical sidelink shared channel (PSSCH), or a physical sidelink feedback channel (PSFCH), and each transmission resource in the second resource pool occupies some or all symbols of one slot in time domain.

4. The communication method according to claim 3, wherein the first resource pool and the second resource pool are subject to time division multiplexing.

5. The communication method according to claim 2, wherein the determining, by the first terminal device, at least one transmission resource in the first resource pool comprises:
   determining, by the first terminal device, an index of the at least one transmission resource based on an index of the first terminal device, wherein the at least one transmission resource in the first resource pool is a transmission resource used to receive the second message.

6. The communication method according to claim 2, wherein the determining, by the first terminal device, at least one transmission resource in the first resource pool comprises:
   determining, by the first terminal device, an index of a second transmission resource based on an index of the first terminal device and an index of the second terminal device, wherein the second transmission resource in the first resource pool is a transmission resource used to receive the second message.

7. The communication method according to claim 1, wherein:
   at least one of a time domain start location or a quantity of occupied time domain symbols of each transmission resource in the first resource pool is preconfigured in the first terminal device, or
   at least one of a time domain start location or a quantity of occupied time domain symbols of each transmission resource in the first resource pool is determined by the first terminal device based on configuration signaling from a network device.

8. The communication method according to claim 7, wherein the configuration signaling is a system information block (SIB), radio resource control (RRC) signaling, or physical layer control information.

9. The communication method according to claim 1, wherein a first time domain symbol occupied by each transmission resource in the first resource pool is used for automatic gain control (AGC) adjustment performed by a receive end.

10. The communication method according to claim 1, wherein the determining, by a first terminal device, a first transmission resource in a first resource pool comprises:
    determining, by the first terminal device based on at least one of an index of the first terminal device or an index of the second terminal device, an index corresponding to the first transmission resource, wherein the first transmission resource in the first resource pool is a transmission resource used to send the first message.

11. A communication method, comprising:
    determining, by a second terminal device, at least one transmission resource in a first resource pool; and
    receiving, by the second terminal device, a first message from a first terminal device on the at least one transmission resource, wherein each transmission resource in the first resource pool occupies some or all symbols of one slot in a time domain, and each transmission resource in the first resource pool occupies one or more sub-channels in a frequency domain, and wherein the at least one transmission resource occupied by the first message is less than one slot.

12. The communication method according to claim 11, further comprising:
    determining, by the second terminal device, a second transmission resource in the first resource pool; and
    sending, by the second terminal device, a second message to the first terminal device by using the second transmission resource.

13. The communication method according to claim 12, further comprising:
    determining, by the second terminal device, a third transmission resource in a second resource pool based on the first message, wherein the second message is used by the first terminal device to determine the first message; and
    sending, by the second terminal device, a third message using the third transmission resource;
    wherein the third message is carried on at least one of a physical sidelink control channel (PSCCH), a physical sidelink shared channel (PSSCH), or a physical sidelink feedback channel (PSFCH), and each transmission resource in the second resource pool occupies some or all symbols of one slot in time domain.

14. The communication method according to claim 12, wherein the determining, by the second terminal device, a second transmission resource in the first resource pool comprises:
    determining, by the second terminal device, an index of the second transmission resource based on the index of the first terminal device and the index of the second terminal device, wherein the second transmission resource in the first resource pool is a transmission resource used to send the second message.

15. The communication method according to claim 11, wherein:
    at least one of a time domain start location or a quantity of occupied time domain symbols of each transmission resource in the first resource pool is preconfigured in the second terminal device; or
    at least one of a time domain start location or a quantity of occupied time domain symbols of each transmission resource is determined by the second terminal device based on configuration signaling from a network device.

16. The communication method according to claim 15, wherein the configuration signaling is a system information block (SIB), radio resource control (RRC) signaling, or physical layer control signaling.

17. The communication method according to claim 11, wherein a first time domain symbol occupied by each transmission resource in the first resource pool is used for automatic gain control (AGC) adjustment performed by a receive end.

18. The communication method according to claim 11, wherein the determining, by a second terminal device, at least one transmission resource in a first resource pool comprises:
    determining, by the second terminal device based on an index of the second terminal device, an index of a transmission resource in the first resource pool, wherein the transmission resource in the first resource pool is a transmission resource used to receive the first message.

19. The communication method according to claim 11, wherein the determining, by a second terminal device, at least one transmission resource in a first resource pool comprises:
    determining, by the second terminal device, an index of a first transmission resource based on an index of the second terminal device and an index of the first terminal device, wherein the first transmission resource in the first resource pool is a transmission resource used to receive the first message.

20. A communication apparatus, comprising:
    at least one processor; and
    one or more memories coupled to the at least one processor and storing programming instructions for execution by the at least one processor to:
        determine a first transmission resource in a first resource pool, wherein each transmission resource in the first resource pool occupies some or all symbols of one slot in a time domain, and each transmission resource in the first resource pool occupies one or more sub-channels in a frequency domain; and
        send a first message to a second terminal device by using the first transmission resource, wherein the first transmission resource occupied by the first message is less than one slot.

* * * * *